United States Patent
Li et al.

(10) Patent No.: US 11,212,537 B2
(45) Date of Patent: Dec. 28, 2021

(54) SIDE INFORMATION FOR VIDEO DATA TRANSMISSION

(71) Applicant: Advanced Micro Devices, Inc., Santa Clara, CA (US)

(72) Inventors: Adam H. Li, Solana Beach, CA (US); Nathaniel David Naegle, Pleasanton, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/368,293

(22) Filed: Mar. 28, 2019

(65) Prior Publication Data

US 2020/0314434 A1 Oct. 1, 2020

(51) Int. Cl.
| | | |
|---|---|---|
| *H04N 19/167* | (2014.01) | |
| *H04N 19/124* | (2014.01) | |
| *H04N 19/176* | (2014.01) | |
| *H04N 19/196* | (2014.01) | |

(52) U.S. Cl.
CPC ......... *H04N 19/167* (2014.11); *H04N 19/124* (2014.11); *H04N 19/176* (2014.11); *H04N 19/196* (2014.11)

(58) Field of Classification Search
CPC .............................. G06K 9/32; G06K 9/3233
USPC .......................................... 375/240.1–240.29
See application file for complete search history.

(56) References Cited

U.S. PATENT DOCUMENTS

| | | |
|---|---|---|
| 6,351,335 B1 | 2/2002 | Perlin |
| 7,783,120 B2 | 8/2010 | Kortum et al. |
| 10,535,178 B2 | 1/2020 | Mirza et al. |
| 2018/0220134 A1 | 8/2018 | Lynch et al. |
| 2019/0050664 A1* | 2/2019 | Yang ........................ G06F 3/011 |

FOREIGN PATENT DOCUMENTS

WO    WO0048090 A1    8/2000

OTHER PUBLICATIONS

Invitation to Pay Additional Fees, Communication Relating to the Results of the Partial International Search and Provisional Opinion Accompanying the Partial Search Result in International Application No. PCT/US2020/026215, dated Jun. 25, 2020, 11 pages.

* cited by examiner

*Primary Examiner* — Nam D Pham
(74) *Attorney, Agent, or Firm* — Kowert Hood Munyon Rankin and Goetzel PC; Rory D. Rankin

(57) ABSTRACT

Systems, apparatuses, and methods for performing efficient video compression are disclosed. A video processing system includes a transmitter sending a video stream over a wireless link to a receiver. The transmitter includes a processor and an encoder. The processor generates rendered blocks of pixels of a video frame, and when the processor predicts a compression level for a given region of the video frame is different from a compression level for immediately neighboring blocks, the processor generates side information. The side information identifies a location of the given region in the video frame and a type of content that causes the compression level differences. The processor sends the rendered video information and the side information as accompanying metadata to the encoder. The encoder updates encoding parameters based on the received side information, and compresses the rendered given region based on the updated encoding parameters.

20 Claims, 13 Drawing Sheets

SIDE INFORMATION FOR VIDEO DATA TRANSMISSION

BACKGROUND

Description of the Related Art

Video processing algorithms are complex and include many different functions.

Advanced processors are used to satisfy the high computation demands. The video processing complexity increases as display resolution increases. Additionally, high definition video encoding applications are growing rapidly in the consumer market space. Further, video processing becomes more complex as the available data bandwidth decreases and the processing occurs in real-time. For example, virtual reality (VR) applications, such as VR gaming applications, are becoming more popular.

For VR applications, a wireless communication link sends a video stream from a computer (or other device) to a virtual reality (VR) headset (or head mounted display (HMD). Transmitting the VR video stream wirelessly eliminates the need for a cable connection between the computer and the user wearing the HMD, thus allowing for unrestricted movement by the user. The VR video content is typically viewed through a lens to facilitate a high field of view and create an immersive environment for the user. Video compression is already a complex process, but video compression becomes more challenging with VR video transmission over a low-bandwidth wireless link while minimizing any perceived reduction in video quality by the end user.

In view of the above, efficient methods and systems for performing efficient video compression are desired.

BRIEF DESCRIPTION OF THE DRAWINGS

The advantages of the methods and mechanisms described herein may be better understood by referring to the following description in conjunction with the accompanying drawings, in which.

Figure 1:
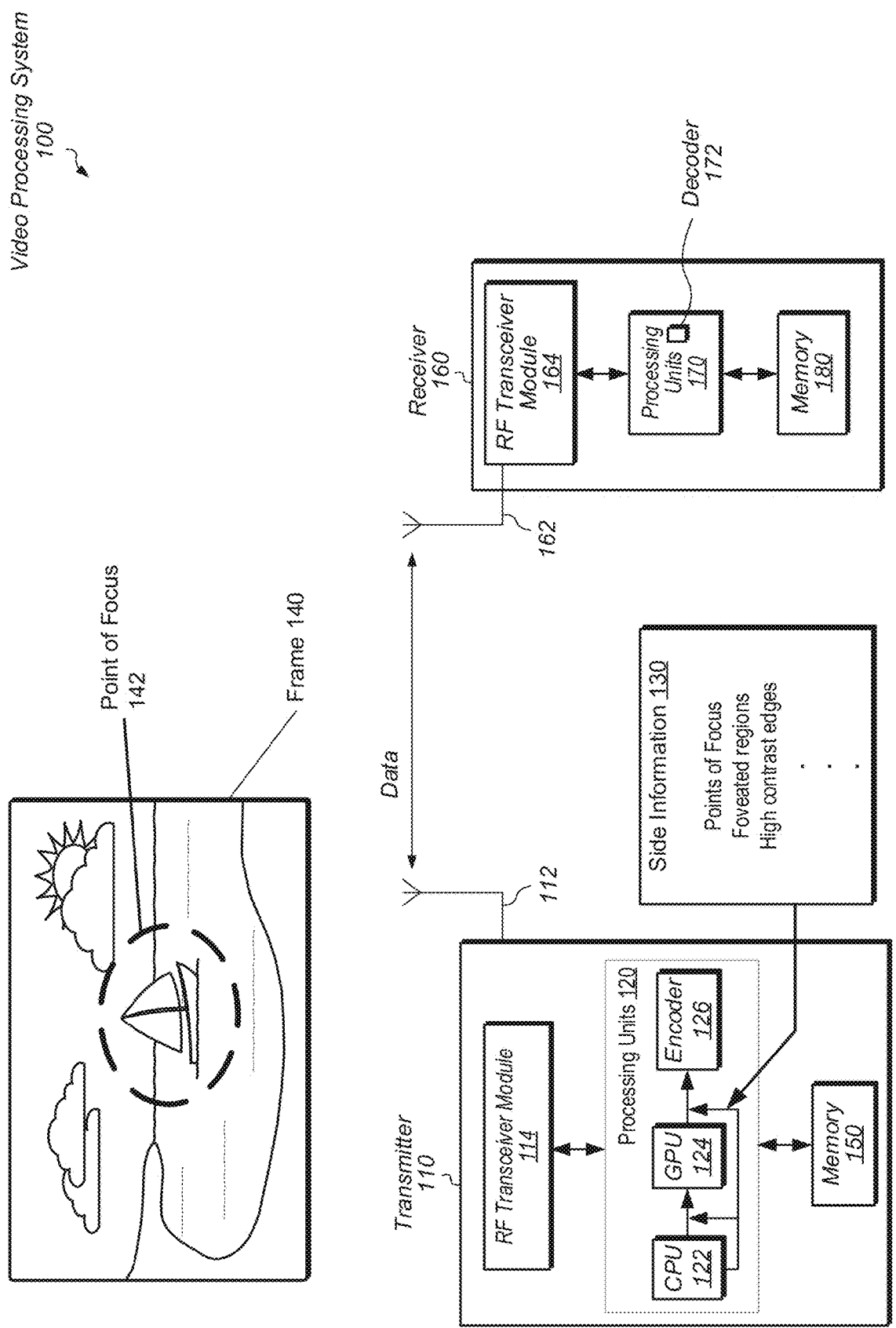
FIG. 1 is a block diagram of one embodiment of a video processing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

In various embodiments, a video processing system includes a transmitter sending a video stream over a wireless link to a receiver. The transmitter includes a processor and a video encoder (or encoder). In some implementations, the processor is a GPU, and the processor generates multiple blocks of pixels of a video frame. The generated blocks of pixels correspond to rendered blocks of pixels of the video frame. In various embodiments, the processor receives one or more of a software hint and a hardware hint indicating that a compression level for a given region, which includes one or more blocks of the video frame, is different from a compression level for immediately neighboring blocks of the video frame located outside the given region. In response to receiving such a hint, the processor generates side information for the given region. In some embodiments, the immediately neighboring blocks are included in a separate region that has separate and corresponding side information. In other embodiments, the immediately neighboring blocks are not included in a separate region that has separate and corresponding side information. For example, in some cases, the immediately neighboring blocks are included in the background of a scene.

The side information identifies a location of the given region in the video frame and includes a geometric description of the given region. Additionally, the side information identifies a type of content in the given region. Examples of the type of content are a region with moving objects, a foveated region, a point of focus, a region with high contrast edges, and so on. In some embodiments, the type of content indicates the compression level of the given region. In other embodiments, the side information includes a separate indication that specifies the compression level for the given region. In yet other embodiments, the side information includes an indication that specifies an absolute value for a particular encoding parameter, which is later used to set or override a value of the particular encoding parameter during encoding of blocks within the given region. Logic in the video encoder replaces the value of the particular encoding parameter generated by one or more blocks in the video encoder with the absolute value specified in the side information. Examples of the particular encoding parameters are a quantization parameter (QP) used by a quantization block in the video encoder and a length of symbols to be encoded by an entropy encoding block in the video encoder.

Further, in other embodiments, the side information includes an indication that specifies a relative value for the particular encoding parameter, which is later used to update the value of the particular encoding parameter during encoding of blocks within the given region. Logic in the video encoder updates the value of the particular encoding parameter generated by one or more blocks in the video encoder by a relative amount specified in the side information. In various designs, the relative amount is a percentage amount or a difference amount. In some examples, the relative amount is a positive amount (e.g., 25% increase), whereas, in other examples, the relative amount is a negative amount (e.g., QP decrease by 5 or symbol length decrease by 3 bits).

In an embodiment, the side information is stored as metadata along with the rendered blocks of pixels of the video frame. In some designs, the processor sends the side information in the video frame according to the HDMI (High Definition Multimedia Interface) specification, the DisplayPort (DP) specification, or other specification. In other embodiments, the processor sends the side information to the encoder as metadata separately from the rendered video information. In some designs, the processor sends the side information using the USB (universal serial bus) interface, the PCIe (Peripheral Component Interconnect Express) interface, or other interface. In various embodiments, the encoder replaces or updates one or more encoding parameters based on the received side information as described earlier.

In some embodiments, when the encoder determines, from the received side information, that a region has a smaller compression level than a compression level of the immediately neighboring blocks, the encoder decreases the quantization parameter from each of a value of the quantization parameter of the immediately neighboring blocks and a value of the quantization parameter that would be generated if the side information was not received. As described earlier, in an embodiment, the decrease is based on an absolute value or a relative value specified for the region in the received side information. When the encoder determines, from the received side information, that the region has a smaller compression level than a compression level of the immediately neighboring blocks, in some embodiments, the encoder performs a full search, of the region in a search area during motion estimation, rather than a fast search that would be used if the side information was not received. In addition, in some embodiments, the encoder increases a precision of fractions generated by an arithmetic entropy coding algorithms due to receiving the side information. Other example of updating encoding parameters based on the received side information are possible and contemplated.

In various examples, the video encoder replaces or updates one or more encoding parameters for frame X by considering the N preceding frames and considering the M following frames where each of N and M is a positive, non-zero integer. In other words, in some embodiments, the side information for a given frame, such as frame X includes information from the side information of one or more other frames, where X is a non-zero, positive integer. For example, the side information for frame X includes a portion of the side information from frame X−N to frame X+M, where N is less than X. In one example, a scene includes a plane flying across the sky. A software hint or a hardware hint identifies the plane as a point of focus, and thus, a region, in the scene. In an example, block 14 of frame X−1 is blue sky, whereas, block 14 of frame X is the nose of the plane.

The side information for frame X−1 includes location information and geometric dimensions of the region (plane) in frame X−1. In an embodiment, the side information for frame X−1 also includes location information and geometric dimensions of the region (plane) in frame X. Therefore, the video encoder is aware that block 14 transitions from blue sky in the background in frame X−1 to the nose of the plane (left edge of the region) in frame X. The video encoder updates the encoding parameters, such as the quantization parameter (QP), in a manner to remove discontinuous, abrupt updates. For example, when using the side information for a single frame, the QP for block 14, frame X−1, which is the background of blue sky, is 20, and the QP for block 14, frame X, which is the nose of the plane, is 8. There is an abrupt change in QP from 20 to 8. It is possible that the abrupt change in QP causes flickering to be seen on the screen by the viewer.

Rather than include an abrupt change in QP between two successive frames, in one embodiment, the video encoder generates a weighed sum, which is used as an averaging formula, to determine the QP for block 14 across multiple frames. In one example, the video encoder updates the QP for block 14 across 4 previous frames, and reduces the QP from 20 to 8 in steps of 3, since (20−8)/4 is 3. Here, each of the frames X−N to X has a same weight of one. In this example, the video encoder generates the QP across frames X−4 to X to be 20, 17, 14, 11 and 8. In other words, the video encoder generates the QP for block 14, frame X−4 to be 20, and the QP for block 14, frame X−3 to be 17, and the QP for block 14, frame X−2 to be 14, and the QP for block 14, frame X−1 to be 11, and the QP for block 14, frame X to be 8. There is no abrupt change in QP for a block between two frames. A similar approach is used for subsequent frames for the example when block 14, frame X is the tail of the plane (right edge of the region), and block 14, frame X+1 is the blue sky background.

Figure 3:
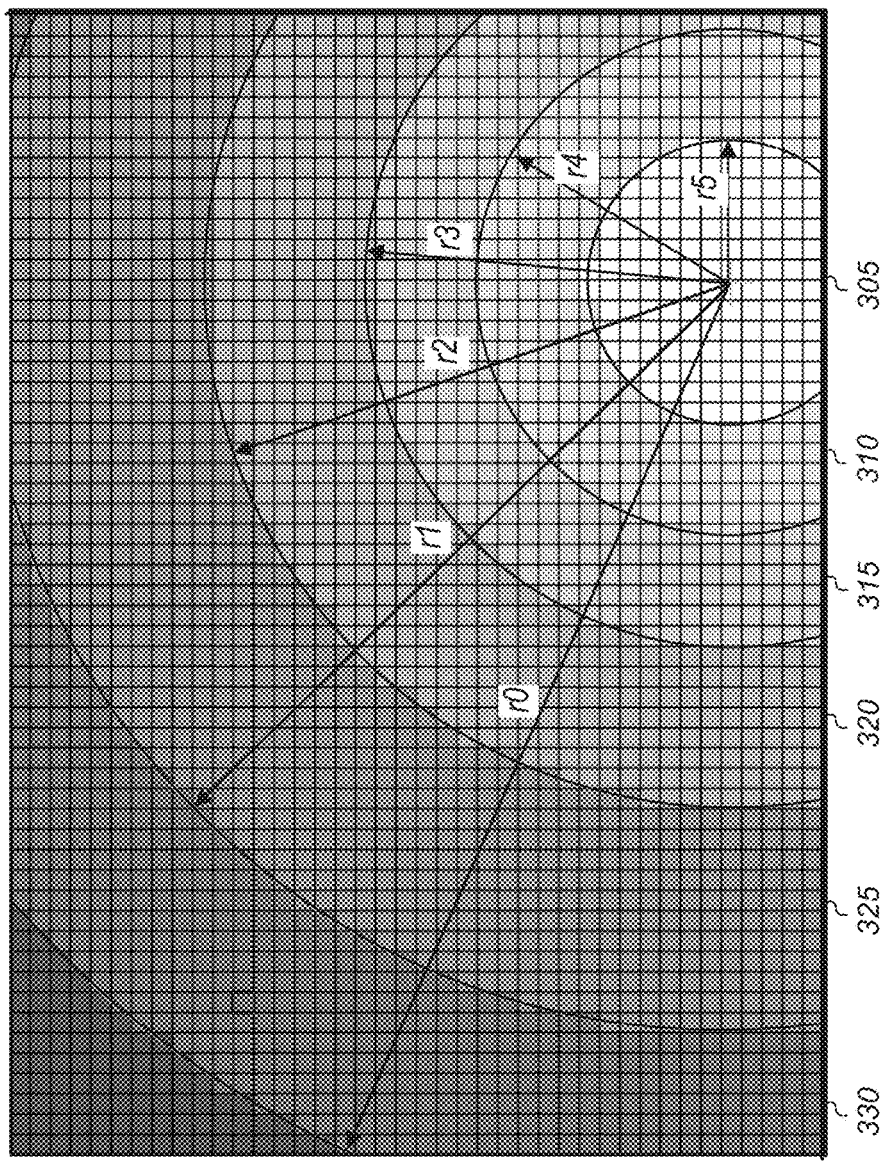
FIG. 3 is a block diagram of one embodiment of concentric regions in a video frame.
Figure 4:
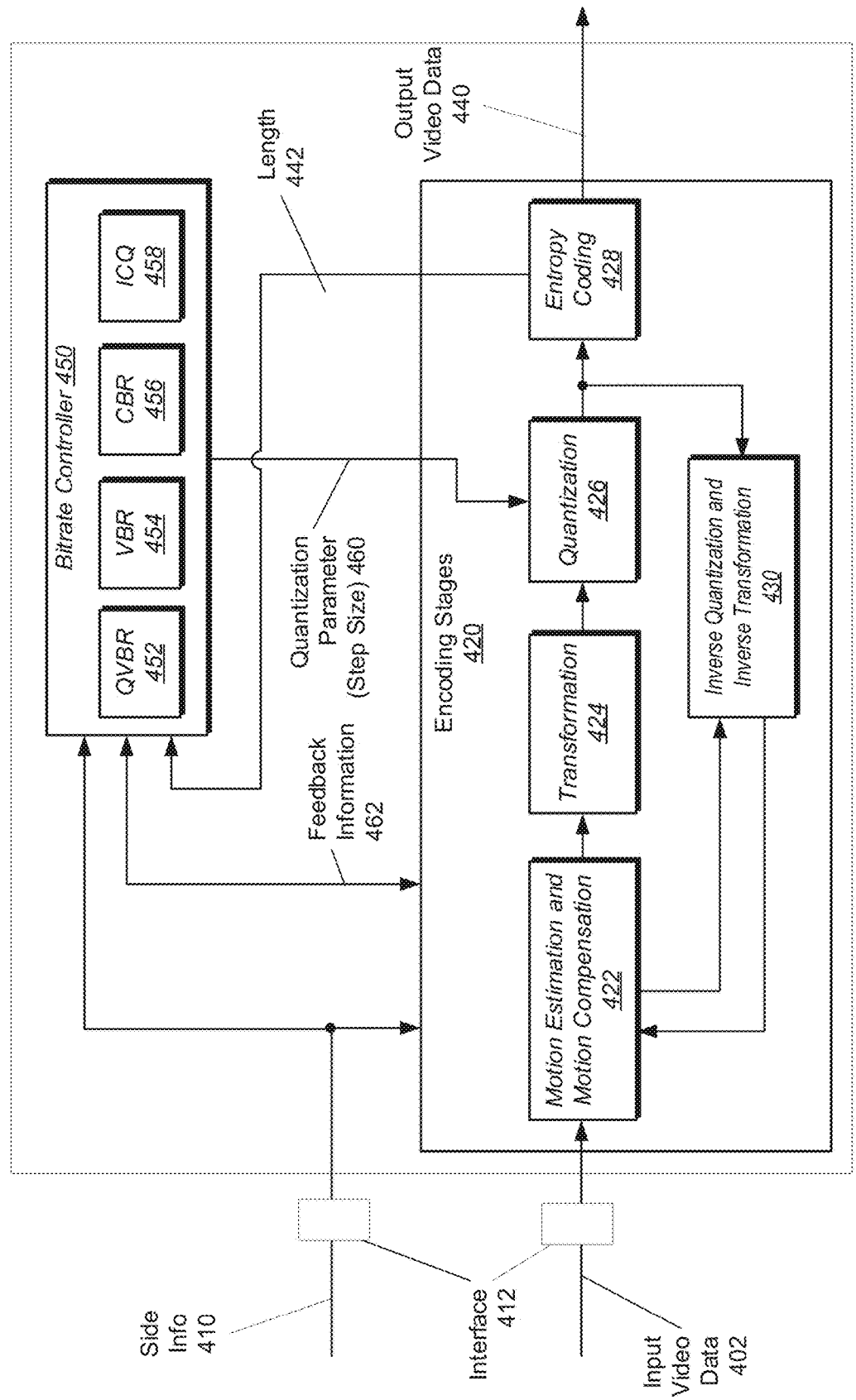
FIG. 4 is a block diagram of one embodiment of a video encoder.
Figure 5:
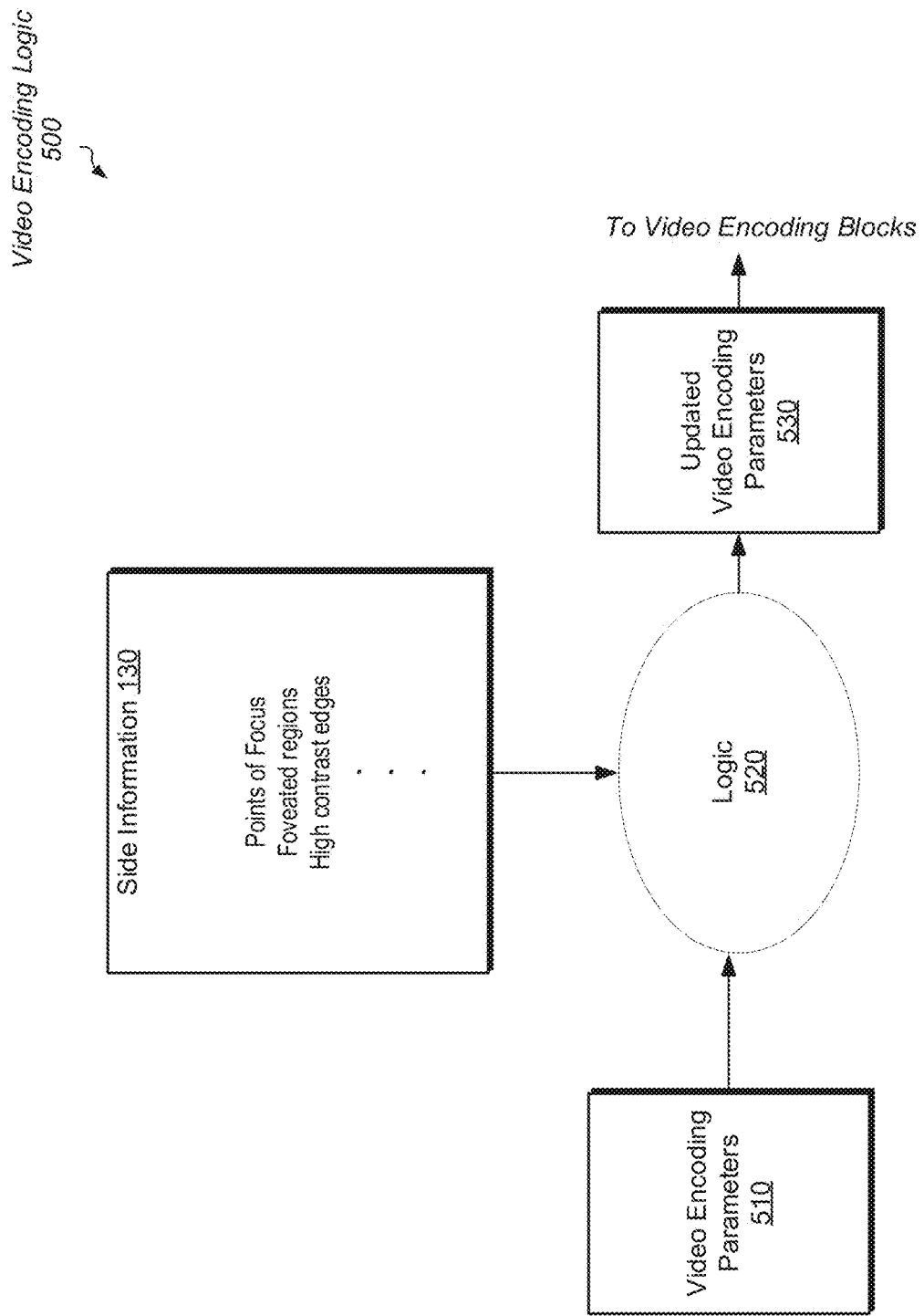
FIG. 5 is a block diagram of one embodiment of video encoding logic.
Figure 6:
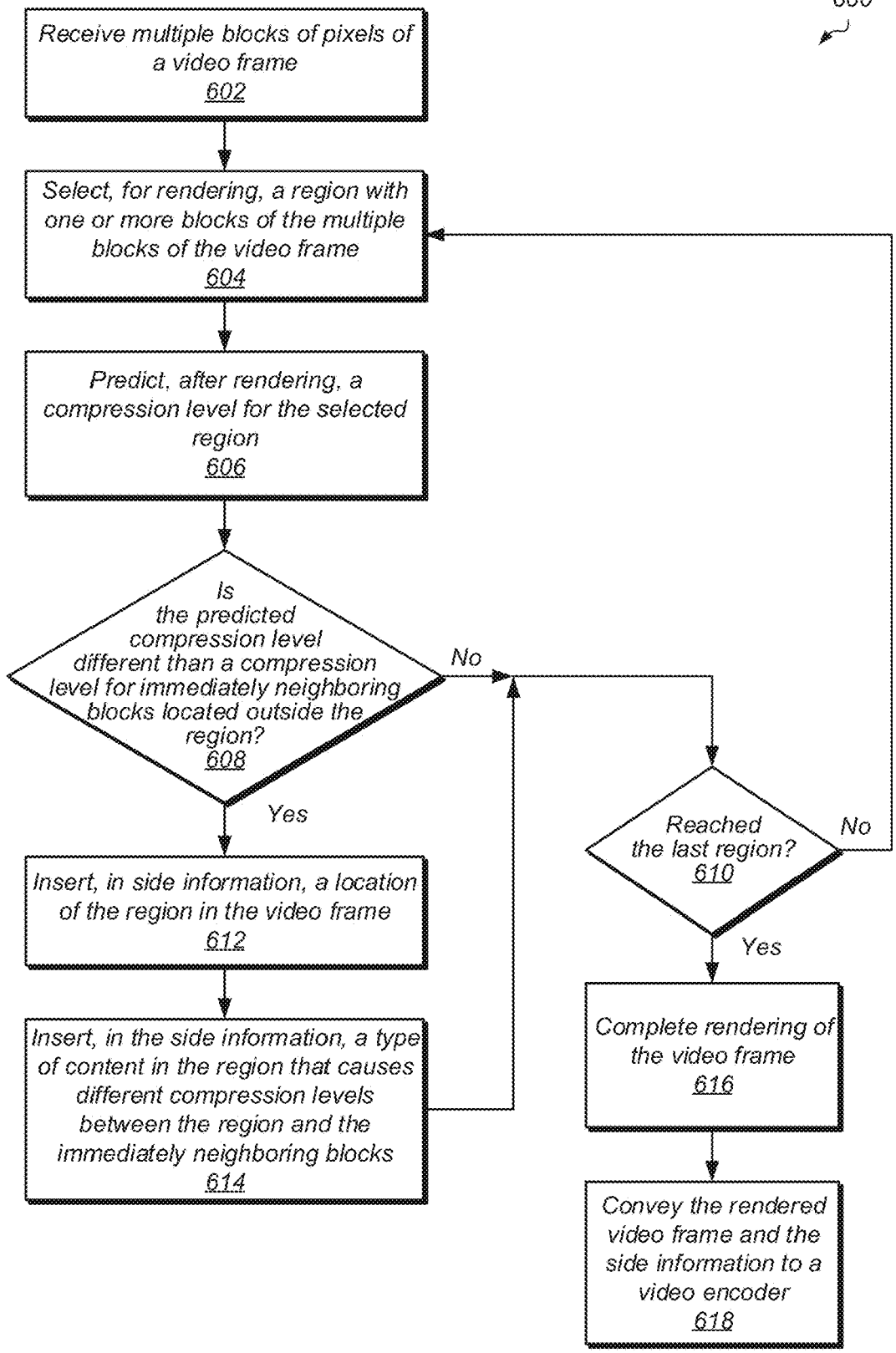
FIG. 6 is a flow diagram of one embodiment of a method for performing efficient video rendering.
Figure 7:
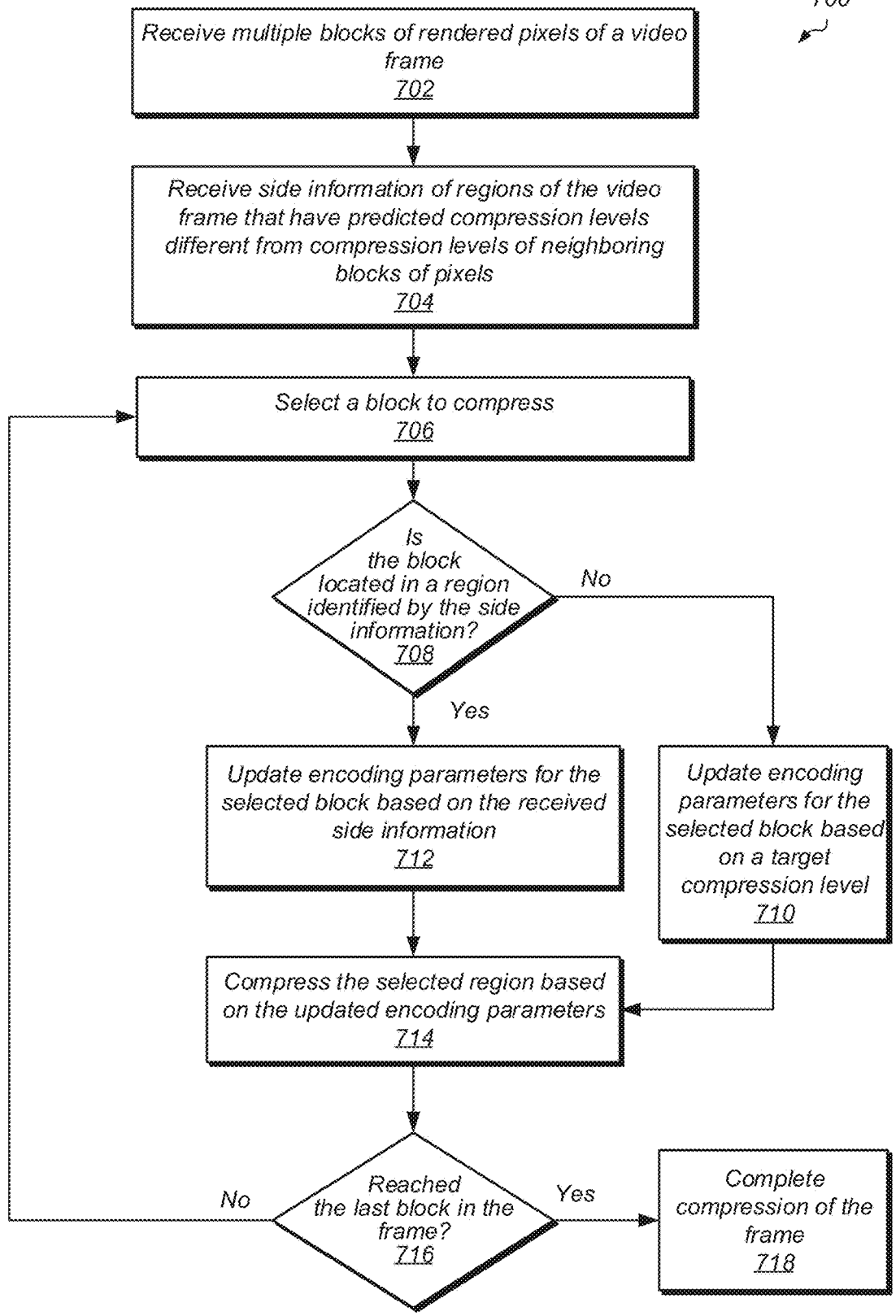
FIG. 7 is a flow diagram of one embodiment of a method for performing efficient video compression.

In the following description, FIGS. 1-2 describe video processing systems using side information to identify regions in a frame where encoding parameters are updated based on the identification of the regions. FIG. 3 describes examples of regions such as concentric regions in a frame. FIGS. 4-5 describe a video encoder and video encoding logic using side information for updating encoding parameters. FIGS. 6-7 describe methods for using side information for updating encoding parameters. Although FIGS. 1-7 describe video encoding logic using side information for updating encoding parameters for a given frame, the circuitry and logic described also is capable of updating encoding parameters based on information of other frames. FIGS. 8-9 and 11-12 describe inter-frame dependency of blocks within a given video frame. FIGS. 10 and 13 described methods for using side information of surrounding frames for updating encoding parameters.

Referring to FIG. 1, a block diagram of one embodiment of a video processing system 100 is shown. The video processing system 100 (or system 100) includes at least a first communications device (e.g., transmitter 110) and a second communications device (e.g., receiver 160) operable to communicate with each other with a limited bandwidth connection. It some embodiments, the limited bandwidth connection is a wired connection. In other embodiments, such as the illustrated embodiment, the limited bandwidth connection is a wireless connection. It is noted that transmitter 110 and receiver 160 can also be referred to as transceivers. Transmitter 110 and receiver 160 are representative of any type of communication devices and/or computing devices. For example, in various implementations, transmitter 110 and/or receiver 160 is one of a mobile phone, a tablet, a desktop computer, a laptop computer, a server, a head-mounted display (HMD), a television, another type of display, router, or other types of computing or communication devices.

In various designs, the transmitter 110 sends video information to the receiver 160 such as rendered information corresponding to the frame 140. Although the frame 140 depicts a picture of a sailboat on a lake, in other examples, the frame 140 includes information for a wide variety of visual information such as a scene of a sporting event, a scene of a video game, and so forth. The transmitter 110 includes any number and type of processors and memory devices for implementing processing units 120 and memory 150. For example, the processing units 120 uses a variety of processors. Examples of the processors are a general-purpose central processing unit (CPU) 122, a graphics processing unit (GPU) 124, an accelerated processing unit (APU), an application specific integrated circuit (ASIC), a field programmable array (FGPA), a video encoder (126), and so forth. Memory 150 uses one or more of a variety of types of synchronous random access memory (SRAM), a variety of types of dynamic random access memory (DRAM), hard disk drives (HDDs), solid state drives (SSDs), and so forth.

In various implementations, the transmitter 110 uses a communication fabric (or fabric), for high-level interconnects and chip communication. The fabric is not shown for ease of illustration. In various embodiments, different types of traffic flows independently through the fabric. The fabric supports the independent flow by allowing a single physical fabric bus to include a number of overlaying virtual channels, or dedicated source and destination buffers, each carrying a different type of traffic. Each channel is independently flow controlled with no dependence between transactions in different channels.

The CPU 122 uses one or more processor cores with circuitry for executing instructions according to one of a variety of predefined general-purpose instruction sets. In some designs, the processor cores use simultaneous multithreading techniques combined with out-of-order scheduling and execution of instructions. The GPU 124 uses multiple parallel execution lanes in a single instruction multiple data word (SIMD) micro-architecture. The multiple parallel execution lanes are also referred to as SIMD units or SIMD lanes. The SIMD lanes operate in lockstep. Each of the SIMD lanes independently processes a unit of data independently of other units of data, but uses the same sequence of operations or commands as used by other SIMD lanes. In one example, one or more of an operating system scheduler and a command processor in the GPU schedules commands on the SIMD lanes.

In some implementations, the GPU 124 includes a pixel-processing pipeline. In other implementations, the pixel-processing pipeline is located externally from the GPU 124. One or more of the SIMD lanes and the pixel-processing pipeline performs pixel value calculations, vertex transformations, and other graphics operations such as color management, ambient-adaptive pixel (AAP) modification, dynamic backlight control (DPB), panel gamma correction, and dither. In various implementations, the processing units 120 include the video encoder 126 to encode (i.e., compress) a video stream prior to transmitting the video stream to receiver 160. In various implementations, the video encoder 126 (or encoder 126) is implemented using any suitable combination of hardware and/or software such as firmware. The encoder 126 generates bits in a bitstream and stores them in a buffer.

The encoder 126 receives uncompressed, rendered video information and generates the bits in the form of a bitstream in a compressed format that conforms to a standard video compression specification. Examples of the compression specification or standard are a variety of proprietary custom-designed codecs, MPEG-2 Part 2, MPEG-4 Part 2, H.264 (MPEG-4 Part 10), H.265 (High Efficiency Video Coding for supporting the compression of 4K video), Theora, RealVideo RV40, VP9, and AV1. The compression provided by the encoder 126 is typically lossy, so the output compressed video information lacks some of the information present in the original, rendered and uncompressed video information. The video information is typically divided into frames, and the frames are sometimes divided into macroblock, or blocks. Due to the lossy characteristic of compression, the encoder 126 determines which information of the original, rendered and uncompressed video information to remove while minimizing visual quality degradation of the scene depicted on a display device as viewed by a user. For example, the encoder 126 determines which regions of the block or the frame video information to compress with higher compression ratios and which regions to compress with lower compression ratios. In addition, the compression algorithms track the amount of data used to represent the video, which is determined by the bitrate, while also tracking the storage levels of buffers storing the compressed video information to avoid underflow and overflow conditions. Accordingly, the encoder 126 faces many challenges to support compression of the received, rendered video information while achieving a target compression ratio, minimizing latency of video transmission, preventing overflow and underflow conditions of buffers storing output data, and maximizing user subjective image quality on a display device.

In various embodiments, one or more of the CPU 122 and the GPU 124 send the side information 130 to the encoder 126 for aiding the compression of video information received by the encoder 126. In some embodiments, one or more of the CPU 122 and the GPU 124 directly send the content of the side information 130 to the encoder 126. In other embodiments, one or more of the CPU 122 and the GPU 124 send address information pointing to memory locations storing the content of the side information 130. Therefore, the encoder 126 receives the rendered and uncompressed video information (or an address pointing to a memory location storing the video information). In addition, the encoder 126 receives the side information 130 (or an address pointing to a memory location storing the side information 130). In some embodiments, the encoder 126 receives the rendered, uncompressed video information and the side information 130 for a particular frame (or block of multiple blocks of the frame) simultaneously. For example, the encoder 126 receives uncompressed, rendered pixel information for the particular frame and the side information 130 for the particular frame is stored in metadata sections of the frame pixel information. Therefore, side information 130 associated with the particular frame is sent with the pixel information for the particular frame.

The side information 130 includes information that is difficult for the encoder 126 to derive from the received, rendered pixel data and meet timing requirements for the system 100. In some cases, it is not possible for the encoder 126 to derive some components of the side information 130. Therefore, the compression performed by the encoder 126 becomes more efficient with the side information 130 without the encoder 126 attempting to generate the side information 130. The encoder 126 uses the side information 130 to determine which regions to compress and set the compression ratio appropriately. As used herein, an "amount of compression" is also referred to as a "compression level" or a "compression ratio." The larger the compression level or the compression ratio, the greater the amount of compression. Similarly, the smaller the compression level or the compression ratio, the smaller the amount of compression. In various embodiments, the side information 130 for the particular frame, such as frame 140, includes indications of a foveated region, a region that includes high contrast edges, and a point of focus.

As used herein, the term "point of focus" is defined as the portion of the frame where each eye is expected to be focusing when a user is viewing the frame. In some cases, the "point of focus" is determined based at least in part on an eye-tracking sensor detecting the location where the eye is pointing. In other cases, the "point of focus" is determined based on the content of the frame data. For example, in a scene from a video game, a point of focus on the screen is the user's object (e.g., a racecar, a soldier, a football player), which is under the user's game control. In one implementation, the encoder 126 uses the side information 130 to determine to use higher compression ratios for the objects of the background and other objects, which are also not a point of focus. Additionally, the encoder 126 uses the side information 130 to decide to use lower compression ratios for objects in a region that is a point of focus such as the point of focus 142 in the frame 140.

In some embodiments, the encoder 126 selects a range of compression ratios for a range of points of focus. In an embodiment, the side information 130 includes information for a primary point of focus as well as information for non-primary points of focus such as a secondary point of focus, a tertiary point of focus and so on. In one example, the primary point of focus is the user's object (e.g., a racecar, a soldier, a football player) in the video game. A secondary point of focus is one of an opposing player's object, the scrollbar displaying statistical data at the bottom of the screen, and so on. For the primary point of focus, the encoder 126 selects the lowest compression ratio. For the secondary point of focus, the encoder 126 selects a mid-range compression ratio. For a tertiary point of focus, if there is one, the encoder 126 selects a compression ratio between the compression ratio of the secondary point of focus and the highest compression ratio. For objects that are not located in any point of focus, such as the background, the encoder 126 selects the highest compression ratio.

In some implementations, transmitter 110 and receiver 160 communicate wirelessly over the unlicensed 60 Gigahertz (GHz) frequency band. Wireless communication devices that operate within extremely high frequency (EHF) bands, such as the 60 GHz frequency band, are able to transmit and receive signals using relatively small antennas. For example, in one implementation, transmitter 110 and receiver 160 communicate in accordance with the Institute of Electrical and Electronics Engineers (IEEE) 802.11 ad standard (i.e., WiGig). In other implementations, transmitter 110 and receiver 160 communicate wirelessly over other frequency bands and/or by complying with other wireless communication protocols, whether according to a standard or otherwise. For example, other wireless communication protocols that can be used include, but are not limited to, Bluetooth®, protocols utilized with various wireless local area networks (WLANs), WLANs based on the Institute of Electrical and Electronics Engineers (IEEE) 802.11 standards (i.e., WiFi), mobile telecommunications standards (e.g., CDMA, LTE, GSM, WiMAX), etc.

In one implementation, the video processing system 100 executes a virtual reality (VR) application for wirelessly transmitting frames of a rendered virtual environment from transmitter 110 to receiver 160. In other implementations, the video processing system 100 includes other types of applications that take advantage of the methods and mechanisms described herein. In one implementation, transmitter 110 includes at least radio frequency (RF) transceiver module 114, processing units 120, memory 150, and antenna 112. RF transceiver module 114 transmits and receives RF signals. In one implementation, RF transceiver module 114 is an mm-wave transceiver module operable to wirelessly transmit and receive signals over one or more channels in the 60 GHz band. RF transceiver module 114 converts baseband signals into RF signals for wireless transmission, and RF transceiver module 114 converts RF signals into baseband signals for the extraction of data by transmitter 110.

It is noted that RF transceiver module 114 is shown as a single unit for illustrative purposes. It should be understood that, in other implementations, the transmitter 110 includes any number of different units (e.g., chips) depending on the implementation of the RF transceiver module 114. Transmitter 110 also includes antenna 112 for transmitting and receiving RF signals. Antenna 112 represents one or more antennas, such as a phased array, a single element antenna, a set of switched beam antennas, etc., that can be configured to change the directionality of the transmission and reception of radio signals. As an example, antenna 112 includes one or more antenna arrays, where the amplitude or phase for each antenna within an antenna array can be configured independently of other antennas within the array. Although antenna 112 is shown as being external to transmitter 110, in other implementations, antenna 112 is included internally within transmitter 110. Additionally, in other embodiments, transmitter 110 is included in any number of other components, which are not shown to avoid obscuring the figure. Similar to transmitter 110, the components implemented within receiver 160 include at least RF transceiver module 164, processor 170, decoder 172, memory 180, and antenna 162, which are analogous to the components described above for transmitter 110. It should be understood that receiver 160 can also include or be coupled to other components (e.g., a display).

Figure 2:
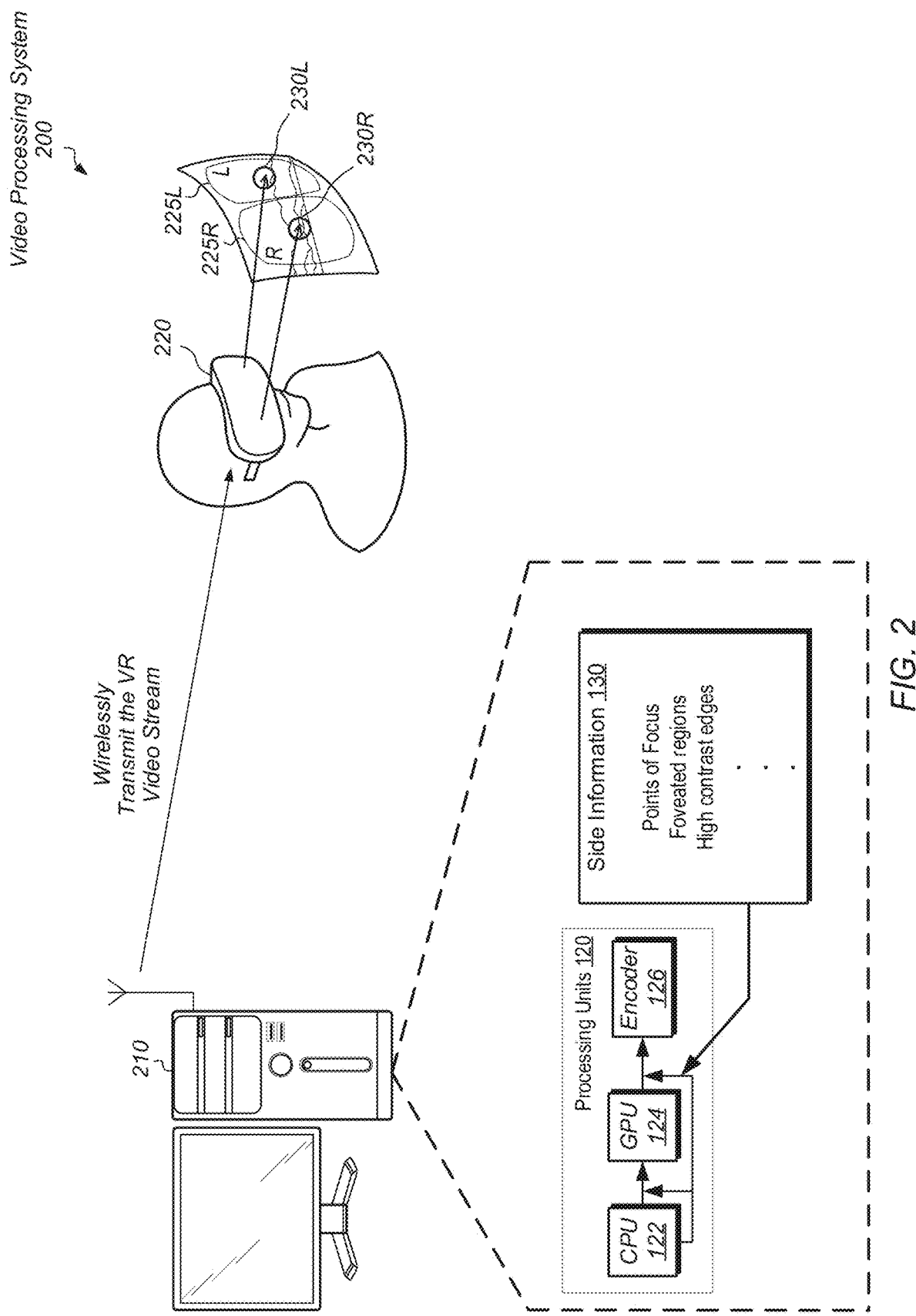
FIG. 2 is a block diagram of another embodiment of a video processing system.

Turning now to FIG. 2, a block diagram of one embodiment of a video processing system 200 is shown. Circuitry and logic previously described are numbered identically. In the illustrated embodiment, the video processing system 200 is a wireless virtual reality (VR) system 200. The video processing system 200 (or system 200) includes at least computer 210 and head-mounted display (HMD) 220. Computer 210 is representative of any type of computing device. Examples of the computer device are one or more processors, memory devices, input/output (I/O) devices, RF components, antennas, and other components indicative of a personal computer or other computing device. In other implementations, other computing devices, besides a personal computer, are utilized to send video data wirelessly to head-mounted display (HMD) 220. For example, computer 210 can be a gaming console, smart phone, set top box, television set, video streaming device, wearable device, a component of a theme park amusement ride, or otherwise. In addition, in other implementations, HMD 220 can be a computer, desktop, television or other device used as a receiver connected to a HMD or other type of display.

Computer 210 and HMD 220 each include circuitry and/or components to communicate wirelessly. It is noted that while computer 210 is shown as having an external antenna, this is shown merely to illustrate that the video data is being sent wirelessly. It should be understood that, in other embodiments, computer 210 has an antenna internal to the external case of computer 210. Additionally, while computer 210 can be powered using a wired power connection, HMD 220 is typically battery powered. Alternatively, computer 210 can be a laptop computer (or another type of device) powered by a battery.

In one implementation, computer 210 includes circuitry, such as one or more of CPU 122 and GPU 124, which dynamically renders a representation of a VR environment to be presented to a user wearing HMD 220. For example, the CPU 122 executes a software application with instructions for rendering the VR environment and CPU 122 sends rendering commands to the GPU 124 and encoding (compressing) commands to the encoder 126. In other implementations, computer 210 includes other types of processors, including an application specific integrated circuit (ASIC), a field programmable gate array (FPGA), a digital signal processor (DSP), or other processor types.

In various embodiments, the encoder 126 receives the side information 130 from one or more of a variety of processor types. The encoder 126 uses the side information 130 to compress the rendered video information in a frame in an efficient manner. For example, the encoder 126 uses the side information 130 to determine which regions of the frame video information to compress with higher compression ratios and which regions to compress with lower compression ratios. In some embodiments, the information 130 is metadata that is both stored with the associated rendered information (blocks of rendered pixels) for a frame and sent along with the rendered information (blocks of rendered pixels) for the frame to the encoder 126.

In some embodiments, the side information 130 includes one or more fields in the metadata of a block of rendered pixels storing particular encodings, and logic in the encoder 126 decodes these fields. The CPU 122 receives an indication from the software application executing on the CPU 122 or from external hardware, such as HMD 220, that specifies a point of focus. In some embodiments, the indication also includes geometric dimensions of a region designated as the point of focus. In other embodiments, the GPU 124 determines the geometric dimensions of the region designated as the point of focus. In one example, the CPU 122 receives an indication of a foveated region from the HMD 220, and the HMD 220 sends location information such as the foveated region is located at 2200 pixels from the left side of the screen and 1300 pixels up from the bottom of the screen. The region is a circle with a radius of 700 pixels measured in the horizontal direction. In other examples, the distances are measured as a percentage of the screen width or a variety of other units. In some embodiments, particular identifiers are used to indicate that the information corresponds to a foveated region. The identifiers also indicate the type of dimensions being provided. In other embodiments, the placement or ordering of the values indicate whether upcoming data corresponds to a foveated region or which dimensions for the region are being set.

In another example, the CPU 122 executes a software application, such as a video game, and the software application provides an indication of a point of focus. This indication specifies a region with its center located at 800 pixels from the left side of the screen and 900 pixels up from the bottom of the screen. The region is an oval with a long axis of 600 pixels measured in the horizontal direction and a short axis of 200 pixels measured in the vertical direction. When the encoder 126 receives side information 130 corresponding to this region, the encoder 126 reduces the compression ratio for rendered pixels of this region. In some embodiments, the side information 130 identifies a high contrast region. One example of a high contrast region is an abrupt change in average color from one region of a scene to a neighboring region of the scene, especially when the boundary between the regions is oriented in a non-horizontal direction. In an embodiment, the software application provides an indication of the high contrast region to the CPU 122. In another embodiment, the GPU 124 determines the high contrast region. In an example, the high contrast region exists in a region located at 2100 pixels from the left side of the screen and 1500 pixels up from the bottom of the screen. The region is an oval with a long axis of 300 pixels measured in the vertical direction and a short axis of 100 pixels measured in the horizontal direction. For this high contrast region, the encoder 126 reduces the compression ratio for rendered pixel data.

Although shapes of a circle and an oval are used as examples in information 130, it is possible and contemplated that the information 130 uses a variety of other shapes and corresponding dimensions. For example, in some embodiments, the information 130 includes a three-dimensional (3-D) direction vector to indicate a foveated region. In other embodiments, the information 130 includes pairs of values where the first value is a type value indicating the type of side information and the second value indicates the value in given units for the side information indicated by the first value. In yet other embodiments, the position in a list of values indicates the type of the side information.

In an embodiment, the encoder 126 dynamically adjusts encoding parameters based on whether the pixels that are currently being processed are located within a region identified by the side information 130. In some embodiments, the encoder 126 increases the compression ratios for portions of horizontal video lines that do not intersect any of the regions identified by the side information 130. In contrast, the encoder 126 reduces the compression ratios for portions of horizontal video lines that intersect any of the regions identified by the side information 130. In an embodiment, the encoder 126 also uses the identified region to determine how much to reduce compression ratios. As described earlier, in one embodiment, the encoder 126 reduces the compression ratios more for the region of a primary point of focus than for the regions of secondary and tertiary points of focus to allow more of the rendered pixel data for the region of the primary point of focus to be sent to the receiver.

In some embodiments, the side information 130 includes an indication that specifies an absolute value for a particular encoding parameter, which is later used to set or override a value of the particular encoding parameter during encoding of blocks within the given region. Logic in the video encoder 126 replaces the value of the particular encoding parameter generated by one or more blocks in the video encoder 126 with the absolute value specified in the side information. Examples of the particular encoding parameters are a quantization parameter (QP) used by a quantization block in the video encoder and a length of symbols to be encoded by an entropy encoding block in the video encoder.

In other embodiments, the side information 130 includes an indication that specifies a relative value for the particular encoding parameter, which is later used to update the value of the particular encoding parameter during encoding of blocks within the given region. Logic in the video encoder 126 updates the value of the particular encoding parameter generated by one or more blocks in the video encoder 126 by a relative amount specified in the side information. In various designs, the relative amount is a percentage amount or a difference amount. In some examples, the relative amount is a positive amount (e.g., 25% increase), whereas, in other examples, the relative amount is a negative amount (e.g., QP decrease by 5 or symbol length decrease by 3 bits).

As described earlier, in some embodiments, the side information is stored as metadata along with the rendered blocks of pixels of the video frame. In some designs, one or more of the processors 122-124 send the side information 130 to the encoder 126 in the video frame according to the HDMI (High Definition Multimedia Interface) specification, the DisplayPort (DP) specification, or other specification. In other embodiments, one or more of the processors 122-124 send the side information 130 to the encoder 126 as metadata separately from the rendered video information. In some designs, one or more of the processors 122-124 send the side information 130 using the USB (universal serial bus) interface, the PCIe (Peripheral Component Interconnect Express) interface, or other interface.

Returning to the receiver device, HMD 220 includes circuitry to receive and decode a compressed bitstream sent by computer 210 to generate frames of the rendered VR environment. HMD 220 then drives the generated frames to the display integrated within HMD 220. Within each image that is displayed on HMD 220, the scene 225R being displayed on the right side 225R of HMD 220 includes a focus region 230R while the scene 225L being displayed on the left side of HMD 220 includes a focus region 230L. These focus regions 230R and 230L are indicated by the circles within the expanded right side 225R and left side 225L, respectively, of HMD 220.

In one implementation, the locations of focus regions 230R and 230L within the right and left half frames, respectively, are determined based on eye-tracking sensors within HMD 220. In another implementation, the locations of focus regions 230R and 230L are specified by the VR application based on where the user is expected to be looking. It is noted that the size of focus regions 230R and 230L can vary according to the implementation. For example, in one implementation, if HMD 220 includes eye-tracking sensors to track the in-focus region based on where the gaze of each of the user's eyes is directed, then focus regions 230R and 230L can be relatively smaller. Otherwise, if HMD 220 does not include eye-tracking sensors and the focus regions 230R and 230L are determined based on where the user is statistically likeliest to be looking, then focus regions 230R and 230L can be relatively larger. In other implementations, other factors can cause the sizes of focus regions 230R and 230L to be adjusted.

In one implementation, the encoder 126 uses the lowest amount of compression for blocks within focus regions 230R and 230L to maintain the highest subjective visual quality and highest level of detail for the pixels within these regions. It is noted that "blocks" can also be referred to as "slices" herein. As used herein, a "block" is defined as a group of contiguous pixels. For example, in one implementation, a block is a group of 8×8 contiguous pixels that form a square in the image being displayed. In other implementations, other shapes and/or other sizes of blocks are used. Outside of focus regions 230R and 230L, the encoder 126 uses a higher amount of compression. This approach takes advantage of the human visual system with each eye having a large field of view but with the eye focusing on only a small area within the large field of view. Based on the way that the eyes and brain perceive visual data, a person will typically not notice the lower quality in the area outside of the focus region.

In one implementation, the encoder 126 increases the amount of compression that is used to encode a block within the image the further the block is from the focus region. For example, if a first block is a first distance from the focus region and a second block is a second distance from the focus region, with the second distance greater than the first distance, the encoder will encode the second block using a higher compression rate than the first block. This will result in the second block having less detail as compared to the first block when the second block is decompressed and displayed to the user. In one implementation, the encoder 126 increases the amount of compression that is used by increasing a quantization strength level that is used when encoding a given block. For example, in one implementation, the quantization strength level is specified using a quantization parameter (QP) setting. In other implementations, the encoder 126 increases the amount of compression that is used to encode a block by changing the values of other encoding settings. For example, when the encoder 126 determines from the side information 130 that particular pixels correspond to blades of grass in a primary point of focus or other examples of high contrast edges, the encoder 126 reduces the amount of compression for these particular pixels.

Turning now to FIG. 3, one embodiment of a diagram of concentric regions 300, corresponding to different compression levels, outside of a focus region of a half frame is shown. In some embodiments, region 305 is a point of focus region. For example, in an embodiment, region 305 is a foveated region determined by an eye-tracking sensor in a head mounted display (HMD). In another embodiment, region 305 is a region determined by a GPU or other type of processor to include high contrast edges. In another embodiment, region 305 is a region determined by a GPU or other type of processor to include a point of focus. In any of the cases, the GPU or other type of processor determines the compression level to use for region 305 is different from a compression level to use for the surrounding regions such as the immediately neighboring region 310.

Each box in the diagram represents a slice of a half frame, with the slice including any number of pixels with the number varying according to the implementation. In each half of the screen, each slice's distance from the eye fixation point is determined using formula 335 at the bottom of FIG. 3. In formula 335, $s_b$ is the slice size. In one implementation, $s_b$ is either 8 or 16. In other implementations, $s_b$ can be other sizes. The variables $x_{offset}$ and $y_{offset}$ adjust for the fact that slice (x, y) is relative to the top-left of the image and that $x_{eye}$ and $y_{eye}$ are relative to the center of each half of the screen. The slice size divided by two is also added to each of $x_{offset}$ and $y_{offset}$ to account for the fact $(s_b*x_i, s_b*y_i)$ is the top-left of each slice and the goal is to determine if the center of each slice falls inside or outside of each radius.

Then, after calculating $d_i^2$ using formula 335, $d_i^2$ is compared to the square of each of "N" radii $(r_0, r_1, r_2, \ldots r_N)$ to determine which compression region the slice belongs to, where N is a positive integer. In the implementation shown in FIG. 3, N is equal to five, but it should be understood that this is shown merely for illustrative purposes. For example, in this implementation, region 305 is the focus region with radius indicated by arrow r5. Region 310 is the region adjacent to the focus region with radius indicated by arrow r4. Region 315 is the next larger region with radius indicated by arrow r3. Region 320 is the next larger region with radius indicated by arrow r2. Region 325 is the next larger region with radius indicated by arrow r1, and region 330 is the largest region shown in diagram 300 with radius indicated by arrow r0. In another implementation, N is equal to 64 while in other implementations, N can be any of various other suitable integer values.

Based on the distance to a given slice (or based on the square of the distance to the given slice) from the center of the focus region 305, the encoder determines to which compression region the given slice belongs. In one implementation, once the region to which the slice belongs is identified, a region identifier (ID) is used to index into a lookup table. The N radii are stored in the lookup table. In one implementation, the radius-squared values are stored in the lookup table to eliminate the need for a hardware multiplier. In one implementation, the radius-squared values are programmed in monotonically decreasing order such that entry zero specifies the largest circle, entry one specifies the second largest circle, and so on.

In one implementation, the output from the lookup table is a full target compressed size for the slice. The "region ID" can also be referred to as a "zone ID" herein. The target size is scaled with a compression ratio (or c_ratio) value before being written into a FIFO buffer for later use as wavelet slices are processed. Scaling by some function of c_ratio produces smaller target slice sizes, which is appropriate for reduced radio frequency (RF) link capacity. In various embodiments, side information, such as the side information 130 (of FIG. 1 and FIG. 2), includes the distances to the given slice.

Referring now to FIG. 4, a generalized block diagram of one embodiment of a video encoder 400 that uses side information 410 received via an interface(s) 412 to adjust compression dynamically is shown. In various embodiments, the video encoder 400 is equivalent to the encoder 126 (of FIG. 1 and FIG. 2). The video encoder 400 (or encoder 400) receives input video data 402 via an interface(s) 412 and generates output video data 440, which is a compressed version of the input video data 402. In various embodiments, interface(s) 412 include any suitable circuitry for receiving side information 410 and video data 402, such as one or more buses, or otherwise. In some embodiments, separate interface circuitry 412 is used for receiving the side information 410 and video data 402. In other embodiments, combined interface circuitry is used to receive both the side information 410 and the video data 402. Various such embodiments are possible and are contemplated. In various implementations, the encoder 400 compresses the input video data 402 based on one of a variety of video compression standards and the received side information 410. The encoder 400 includes the encoding stages 420 and the bitrate controller 450. Although particular logic blocks are described, in other embodiments, one or more of the logic blocks 422-458 are not used, and one or more additional logic blocks are added.

In various designs, the encoder 400 receives the input video data 402 as rendered data. For example, an external GPU generates multiple blocks of pixels for a frame based on rendering commands received from a CPU. In various designs, the encoder 400 generates the output video data 440 as a bitstream. As used herein, a "bitstream" is a sequence of bits. In some cases, the output bitstream of the encoder is measured as a "bitrate," which is a number of bits that are generated or processed per unit of time. For example, in some designs, the bitrate is expressed in units of kilobits per second (kbps) or megabits per second (mbps). Feedback loops located both within the encoding stages 420 and between the bitrate controller 450 and the encoding stages 420 set the bitrate for the output video data 440. The feedback loops ensure this bitrate does not fall below a lower limit that produces a poor subjective quality image to the user on the display. The feedback loops also prevent the output bitrate to exceed an upper limit set by external factors. One example of an external factor is the available link bandwidth. Another example of an external factor is the amount of storage utilization of an external buffer (not shown). The encoder 400 generates the output video data 440 in a manner that does not cause underflow or overflow for the external buffer.

The encoding stages 420 includes multiple logic blocks. During video compression, the encoder 400 determines spatial redundancy within a frame and determines temporal redundancy between frames. Logic block 422 includes logic for estimating any detected motion in the frame and compensates for any estimated motion. In some designs, a user-defined storage limit is set, which determines how many previous frames to store for the processing of a current frame. The logic block 422 compares data of the current frame in the input video data 402 to data of the one or more previous frames based on a motion estimation algorithm. The user or the algorithm of a software application defines a frame buffer size to use for storing one, two or other number of previous frames. In many designs, this storage parameter is a parameter that is set prior to encoding video content. The larger the setting for this storage parameter, the higher the number of previous frames stored in the frame buffer and the higher the amount of storage space consumed in the frame buffer during video compression.

The logic block 422 determines temporal redundancies between the current frame and the one or more previous frames using one of a variety of motion estimation algorithms. The motion estimation algorithm divides the frame into blocks and sometimes divides the blocks into sub-blocks. Blocks or sub-blocks have one of a variety of sizes such as 16 pixels by 16 pixels, 8 pixels by 8 pixels, 4 pixels by 4 pixels, and so on. The smaller the sub-blocks and the more numerous the sub-blocks used for motion estimation, the better that the motion estimation algorithm represents complex motion. However, the amount of processing time (latency), data storage space and algorithm complexity all additionally increase.

Many times, when a region of the frame provided in the input video data 402 is identified as a common background or other smooth area, the motion estimation algorithm uses 16 pixel by 16 pixel blocks. When a region of the frame provided in the input video data 402 is identified as providing high detail to the viewer of the display, the motion estimation algorithm uses 4 pixel by 4 pixel sub-blocks. In some embodiments, the motion estimation algorithm in the logic block 422 uses the side information 410 to determine the regions that provide high visual detail to the viewer of the display. Thus, the motion estimation algorithm selects using smaller and more numerous sub-blocks in such regions based on the received side information 410. In some embodiments, the use of multiple prior frames for motion estimation introduces unacceptable latency in the encoding process such as for virtual reality (VR) applications. Therefore, the identification of temporal latency using motion vectors is removed.

The motion estimation algorithm determines a search area, which is also referred to as a search window, in a reference frame. In one example, the reference frame is the immediate previous frame compared to the current frame with data in the input video data 402. The search area in the reference frame includes multiple blocks or sub-blocks located in horizontal video lines and vertically in columns. The motion estimation algorithm selects a block or sub-block in the current frame and searches the search area in the reference frame for the best matching block or sub-block. To determine the best matching block or sub-block, the motion estimation algorithm calculates motion vectors for each of the blocks or sub-blocks. The motion estimation algorithm calculates 16 motion vectors for a 4 pixel by 4 pixel sub-block.

If the motion estimation algorithm searches every block or sub-block in the search area, then it is referred to as a full or exhaustive search motion estimation algorithm. If the motion estimation algorithm skips some of the blocks or sub-blocks, then it is referred to as a fast search motion estimation algorithm. In some embodiments, the logic block 422 uses the received side information 410 to determine whether to use an exhaustive search or a fast search in the motion estimation algorithm based on the received side information 410. For example, if the side information 410 identifies a region with high contrast edges, a region that is a foveated region, and so forth, where the compression level is less than the compression level of blocks immediately neighboring the region, then the logic block 422 uses an exhaustive motion estimation algorithm with numerous, small sub-blocks in the search area.

The steps above for the logic block 422 predicts which block or sub-block in the reference frame has the most similar appearance (or smallest calculated error based on the motion vectors) to the selected block or sub-block in the current frame. Similar predictions are made regarding neighboring blocks or sub-blocks within the current frame. In some embodiments, the encoder 400 uses prediction mode schemes (not shown) in place of motion estimation or in addition to motion estimation. The prediction schemes reduce the spatial redundancies between blocks or sub-blocks in a previous frame and a current frame, whereas the motion estimation algorithm reduces the temporal redundancies. With prediction schemes reducing the spatial redundancies, each block or sub-block is processed with an intra-mode prediction scheme or an inter-mode prediction scheme. In both schemes, a prediction block or sub-block is generated based on a reconstructed frame. The encoding stages 420 includes a forward path from logic block 422 to logic blocks 424, 426 and 428. The encoding stages 420 also include a reconstruction path from logic block 422 to logic blocks 424, 426, 430 and back to logic block 422.

If included, the reconstruction path in the encoder 400 includes the logic block 430. Logic block 430 includes logic for an inverse transformation, an inverse quantization, a loop filter and motion compensation to mimic operation on the receiver side. After one or more of the spatial and temporal redundancies are reduced, the output block or sub-block from prediction and/or motion estimation is subtracted from the block or sub-block in the current frame. Additionally, differences between the neighboring blocks or sub-blocks in the current frame and the block or sub-block in the current frame are determined. These subtractions generate a difference block or sub-block, which is transformed by the logic block 424 and quantized by the logic block 426 to generate a set of transformed and quantized coefficients. These coefficients are reordered and entropy encoded by the logic block 428. In some designs, the logic block 424 performs discrete cosine transformation (DCT) on the motion-compensated prediction difference blocks and sub-blocks.

The logic block 426 quantizes the compressed DCT coefficients on a block-by-block (or sub-block by sub-block) basis according to the quantization parameter 460 used as a step size. In one example, the DCT coefficient matrix representing a particular block (or sub-block) is multiplied by a quantization scale code and divided element-wise by the quantization matrix followed by rounding such as rounding to a nearest integer. In some embodiments, the encoding stages 420 includes multiple types of available quantization blocks. Examples of the available quantizers are the H.263 Quantizer and the MPEG-4 Quantizer. The selection of which quantization block and resulting quantization scale code to use is based on a user-defined selection made in a software application and/or the side information 410. In some embodiments, the selections are initially based on the user-defined selection made in the software application, but the selections are dynamically updated based on the side information 410.

The bitrate controller 450 determines the quantization parameter 460. The quantization parameter 460 is used to generate a scaling matrix and determines how much information to remove from a given block (or sub-block) of pixels. Typically, there is a range of values for the quantization parameter 460 and a default value. When the quantization parameter 460 is held at a constant value, the same amount of information is removed from each frame. In one example, the range for the quantization parameter 460 is 0 to 50 with a default value of 23. If the quantization parameter 460 is selected to be 20 and the quantization parameter 460 remains at 20 despite changes in the video complexity, then the subjective visual quality provided on a display to a user suffers. The information in the side information 410 includes an indication of motion in the frame, an indication of high contrast edges, and so forth. In addition, the bitrate in the output video data 440 varies greatly. Therefore, the bitrate controller 450 includes logic to change the quantization parameter 460 based on the feedback information 462, the side information 410, which includes an operating mode that selects one of the available bitrate controllers 452-458, a target block bitstream length, and so on.

Continuing with the above example, in some embodiments, the bitrate controller 450 increases the quantization parameter 460 from 20 to 22 for regions within the frames identified as having high motion. The increased quantization parameter 460 causes more compression for these regions. Similarly, the encoding stages 420 use the increased quantization parameter 460 for regions within the frames identified as having no high contrast edges, no foveated regions and so forth. In the example, the bitrate controller 450 decreases the quantization parameter 460 from 20 to 16 for regions within the frames identified as having no motion, high contrast edges, a foveated region, and so forth. The decreased quantization parameter 460 causes less compression for these regions.

In some designs, the equivalent quantizer step size used by the quantization block 426 has a logarithmic relationship with the quantization parameter 460. In other designs, the equivalent quantizer step size is linearly related or has another relation with the quantization parameter 460. As the quantization parameter 460 increases, the quantizer step size increases. As the quantization parameter 460 increases, the subjective visual quality of the output video data 440 viewed on a display reduces and the size of the output video data 440 also reduces. As the quantization parameter 460 decreases, the subjective visual quality of the output video data 440 viewed on a display improves and the size of the output video data 440 grows.

In order to set the quantization parameter 460, the bitrate controller 450 estimates the video bitrate. The video bitrate for the output video data 440 is the number of bits in the achieved block bitstream length 442 per unit of time. The bitrate controller 450 estimates the video bitrate based on the network available bandwidth and the video complexity of the received input video data 402 in order to adjust the number of bits (size of the bitstream) in the achieved block bitstream length 442 of the output video data 440. The feedback information 462 is used to relate the video complexity from the encoding stages 420 to the bitrate controller 450. The bitrate controller 450 attempts to regulate the achieved block bitstream length 442 of the output video data 440 by adjusting the quantization parameter 460 in order to produce high visual quality images on an external display for the user. In some designs, the bitrate controller 450 performs this regulation while also maintaining the external network bandwidth transmitting the output video data 440 and preventing overflow or underflow conditions for an external video buffer storing the output video data 440.

The bitrate controller 450 selects the quantization parameter 460, which for a given video image complexity determines the achieved block bitstream length 442 for the output video data 440. Again, the number of bits in the achieved block bitstream length 442 per unit of time determines the bitrate for the output video data 440. The bitrate controller 450 uses one of a variety of bitrate control algorithms implemented in the bitrate controllers 452-458 for regulating the output bitrate of the output vide data 440. Examples of the bitrate control algorithms are a constant bitrate (CBR) controller 456, a variable bitrate (VBR) controller 454, an intelligent constant quality (ICQ) controller 458 and a quality-defined (or quality-based) variable bitrate (QVBR) controller 452.

The CBR controller 456 maintains a set (or target) number of bits in the achieved block bitstream length 442 for the entire frame. In some designs, the variance in the number of bits is restricted to 20 percent or less. The CBR controller 456 is sometimes used in systems with a small external video buffer for storing video frame data in systems estimated to use video information with video complexity below a threshold. The ICQ controller 458 is used in systems archiving video information where the subjective visual quality remains high, but the file size is reduced as much as possible. The ICQ controller 458 receives a constant rate factor (CRF), which is also referred to as an ICQ quality factor. This input parameter has a range of values. For example, in some designs, the range is 1 to 51 with the lower values associated with a lower quantization parameter 460, and accordingly, less information is removed from the video information. The video information is less compressed. In contrast, the higher the value of the input parameter CRF, the more the video information is compressed. The achieved block bitstream length 442 is adjusted up and down by adjusting the input parameter CRF for the ICQ controller 458.

In contrast to the CBR controller 456, the VBR controller 454 varies the number of bits in the achieved block bitstream length 442 for the entire frame. For particular blocks, the variance in the number of bits exceeds the variance achieved by the CBR controller 456. In some designs, the VBR controller 454 allows for a 300 percent variance compared to 20 percent or less for the CRB controller 456. Although the VBR controller 454 allows for high variance in the achieved block bitstream length 442, over time, the VBR controller 454 provides an average achieved block bitstream length 442 that is comparable to what is achieved with the CBR controller 456.

The VBR controller 454 provides a higher bitrate to regions of a frame with high video complexity, a foveated region, high contrast edges, and so on while also providing a lower bitrate to regions of a frame without these characteristics. Summing the achieved block bitstream length 442 over time and dividing by the time duration typically provides an average bitrate near a target bitrate. Unlike the CBR controller 456, the VBR controller 454 supports a large external video buffer for storing video content before being decoded. Unlike the ICQ controller 458, the VBR controller 454 supports adjusting the target value for the achieved block bitstream length 442 based on the feedback information 462 such as a utilization of the external video buffer.

Similar to the VBR controller 454, the QVBR controller 452 varies the achieved block bitstream length 442 when needed such as for regions with high contrast edges, a foveated region, and so on. However, unlike the VBR controller 454, the QVBR controller 452 also attempts to maintain a particular quality factor similar to the ICQ controller 458. Similar to the ICQ controller 458, the QVBR controller 452 receives a quality factor (QF). This input parameter has a range of values. For example, the range of values for the QF is 0 to 63 in some designs, and 1 to 100 for other designs, and so on. The lower values of the QF are associated with a lower quantization parameter 460, and accordingly, less information is removed from the video information. The video information is less compressed with a lower QF. Typically, the QVBR controller 452 is used in gaming and streaming systems.

Similar to the logic blocks in the encoding stages 420 and other logic in the bitrate controller 450, the bitrate controllers 452-458 are implemented with one or more of hardware, such as circuitry, software, such as firmware or user-defined software applications, and a combination of hardware and software. Although four types of bitrate controllers 452-458 are shown in the bitrate controller 450, in other embodiments, the bitrate controller 450 uses another number of bitrate control algorithms and other types of bitrate control algorithms. Regardless of the number and selected types of bitrate controllers, the type of bitrate controller actually selected for video compression and the setting of any input parameters, such as a quality factor (QF), is done based on the side information 410.

The entropy coding 428 reorders and performs entropy encoding of the output bitstream received from the quantization block 426. The entropy coding block 428 identifies particular sequences of bits in the received bitstream. Each of these particular sequences of bits is referred to as a symbol. The entropy coding block 428 replaces symbols with other values such as code words or fractions. Two examples of the types of entropy coding algorithms are Huffman coding and arithmetic coding. Huffman-based coding algorithms replace symbols with code words based on a table lookup. Arithmetic-based coding algorithms replace symbols with a fraction between a range of 0 and 1. Hybrid approaches combine using the steps of a table lookup and an arithmetic operation, or select based on operating conditions whether to use a table lookup or an arithmetic operation.

Huffman-based coding algorithms access a table storing code words in order to map symbols to code words. In some designs, the code words have a fixed length where the length is the number of bits used in the code word. In other designs, the code words are variable length code words. The entropy coding block 428 further compresses the bitstream by limiting the average number of bits used to represent the symbols. More frequently occurring symbols are compressed more by using smaller sized code words. Less frequently occurring symbols are compressed less by using larger sized code words.

Arithmetic-based coding algorithms differ from Huffman-based coding algorithms by encoding symbols or other portions (sequences) of the bitstream into a number such as a fraction in a range, or an interval, between 0 and 1. The precision varies for the generated fractions. As more symbols are coded, the algorithm uses a higher precision to represent the sequence identifiers. More frequently occurring symbols are compressed using a larger interval (range) within 0 and 1. For example, for a high frequency occurring symbol, the algorithm selects the interval 0.3 to 0.6. Less frequently occurring symbols are compressed using a smaller interval (range) within 0 and 1. For example, for a low frequently occurring symbol, the algorithm selects the interval 0.1 to 0.2.

In some designs, parameters for the entropy coding block 428 include a first parameter for determining whether to encode symbols with code words stored in a table or encode symbols with an arithmetic operation. A second parameter determines the computational complexity of the arithmetic operation such as the type of arithmetic operations used and any limit on the amount of precision used for the generated fractions. In some embodiments, the entropy encoding block 428 uses the side information 410 to determine the regions that provide high visual detail to the viewer of the display. Thus, the entropy encoding algorithm(s) select higher precision and more complex computations in such regions based on the received side information 410.

Turning now to FIG. 5, a block diagram of one embodiment of a video encoding logic 500 is shown. Circuitry and logic previously described are numbered identically. The logic 520 is implemented in hardware such as circuitry for combinatorial logic and sequential elements, software such as firmware, or a combination of hardware and software. The logic 520 generates the updated video encoding parameters 530 (or output parameters 530) based on updating or modifying the received video encoding parameters 510 (or input parameters 510). The modifications are based on the side information 130. The input parameters 510 includes a variety of video encoding parameters. The previous description of the video encoder 400 describes these input parameters 510 such as a selection of one of multiple available quantizers, a selection of the quantizer scale code of a custom quantizer matrix, a selection of the quantization parameter (step size), a selection of the entropy coding algorithm, selection of the computation complexity limits for the selected entropy coding algorithm, and a selection of the precision used for fractions representation during arithmetic entropy coding.

The previous description of the video encoder 400 describes the logic for updating the input parameters 510 as distributed throughout the video encoder 400. Here, in the video encoding logic 500, the logic 520 is centralized. In various embodiments, the logic for updating the input parameters 510 is centralized, whereas, in other embodiments, the logic is distributed. In yet other embodiments, the logic for updating the input parameters 510 includes both centralized logic for updating a first portion of the input parameters 510 and distributed logic for updating a second portion of the input parameters 510.

Referring now to FIG. 6, one embodiment of a method 600 for performing efficient video rendering is shown. For purposes of discussion, the steps in this embodiment (as well as in FIG. 7) are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement methods 600 and 700.

A processor receives instructions to use for rendering multiple blocks of pixels of a video frame (block 602). In various implementations, the processor is a GPU, which receives the instructions and the multiple blocks of pixels for rendering. The processor selects, for rendering, a region with one or more blocks of the multiple blocks of the video frame (block 604). For example, the CPU marks objects for rendering, or otherwise, communicates that particular objects and/or regions including multiple objects have visually significant properties. In some designs, the CPU tags these regions. These regions include foveated regions, regions with predicted points of focus, and so on.

After rendering the region, the processor predicts a compression level for the selected region (block 606). As described earlier, the CPU tags objects that are predicted to be visually significant, but the CPU is unaware of whether the tagged object is large enough in a scene depicted in the frame or placed in a point of focus. In some cases, after rendering, the GPU performs these determinations. In one example, the GPU determines whether a tagged region includes high contrast edges. In another example, the GPU compares a tagged object with its position in a previous frame to determine whether the positions changed by more than a threshold. In such a case, the GPU determines the tagged object is a moving object. In yet another example, the GPU performs a pre-rendering pass on a tagged object or objects and determines through a deep learning technique or other technique that a region is predicted to be a point of focus. In various embodiments, the GPU predicts a low compression level for regions with high contrast edges, predicted points of focus, foveated regions, and so on. In addition, the GPU predicts a high compression level for regions with moving objects.

If the predicted compression level for the selected region is the same as a compression level for immediately neighboring blocks located outside the selected region ("no" branch of the conditional block 608), then a check is performed to determine whether the last region has been selected. In some cases, a threshold is used when comparing the compression levels. If the difference between the compression levels is within the threshold, then the compression level of the selected region and the compression level of the immediately neighboring blocks located outside the selected region are considered the same. If the last region is not reached ("no" branch of the conditional block 610), then control flow of method 600 returns to block 604 where the processor selects, for rendering, a region with one or more blocks of the multiple blocks of the video frame.

If the predicted compression level for the selected region is different from a compression level for immediately neighboring blocks located outside the selected region ("yes" branch of the conditional block 608), then the processor inserts, in metadata such as side information, a location of the region in the video frame (block 612). In various embodiments, the side information is metadata stored with rendered blocks of pixels for the video frame. As described earlier, the side information has one of a variety of formats for indicating regions in the frame with different compression levels than immediately neighboring pixels.

The processor inserts, in the side information, a type of content in the region that causes different compression levels between the region and the immediately neighboring blocks (block 614). Examples of the type of content are high contrast edges, moving objects, predicted points of focus, foveated regions, and so on. Afterward, control flow of method 600 moves to conditional block 610 where the processor determines whether the last region with a differing compression level has been rendered. If the last region is reached ("yes" branch of the conditional block 610), then the processor completes rendering of the video frame (block 616). For example, the processor renders regions with a compression level the same as immediately neighboring pixels. Afterward, the processor conveys the rendered blocks of pixels of the video frame and the side information to a video encoder (block 618). As described earlier, one or more of the elements described for method 600 (and method 700) are performed concurrently or in a different order than shown. Therefore, in some embodiments, the processor conveys the rendered blocks of pixels and the corresponding side information to the video encoder at the completion of rendering the region. In such embodiments, the processor does not wait for rendering to complete for all of the regions before conveying data to the video encoder. In such cases, the processor transfers data to the video encoder in a pipelined manner.

Referring now to FIG. 7, one embodiment of a method 700 for performing efficient video compression is shown. An encoder receives multiple blocks of rendered pixels of a video frame (block 702). The encoder also receives side information storing information about regions of the video frame that have predicted compression levels different from compression levels of neighboring blocks of pixels (block 704). In some embodiments, the side information is metadata stored with the rendered pixels of the video frame. The encoder selects a block of the multiple blocks of rendered pixels of the video frame to compress (block 706).

If the selected block is not located in a region identified by the side information ("no" branch of the conditional block 708), then the encoder updates encoding parameters for the selected block based on the target compression level (block 710). However, if the selected block is located in a region identified by the side information ("yes" branch of the conditional block 708), then the encoder updates encoding parameters for the selected region based on the received side information (block 712). For example, when the encoder determines, from the received side information, that the region has a larger compression level than a compression level of the immediately neighboring blocks, in some embodiments, the encoder increases the quantization parameter.

In other examples, when the encoder determines, from the received side information, that the region has a smaller compression level than a compression level of the immediately neighboring blocks, in some embodiments, the encoder performs a full search, rather than a fast search, of the region in a search area during motion estimation. In addition, in some embodiments, the encoder increases a precision of fractions generated by an arithmetic entropy coding algorithms. Further, in an embodiment, the encoder decreases a size and a number of blocks to use for motion estimation. In other embodiments, the encoder updates a variety of other encoding parameters such as the encoding parameters described in the encoder 400 (of FIG. 4) and in the encoding parameters 510 (of FIG. 5).

After updating one or more encoding parameters, the encoder compresses the selected region based on the updated encoding parameters (block 714). If the last block of pixels of the frame is not reached ("no" branch of the conditional block 716), then control flow of method 700 returns to block 706 where another block of the multiple blocks of the frame is selected. Otherwise, if the last block of pixels of the frame is reached ("yes" branch of the conditional block 716), then the encoder completes compression of the frame (block 718). Afterward, the encoder sends the compressed pixels of the video frame to a transmitter, which sends the compressed video information to a receiver for decoding and displaying the video information on a display.

Figure 8:
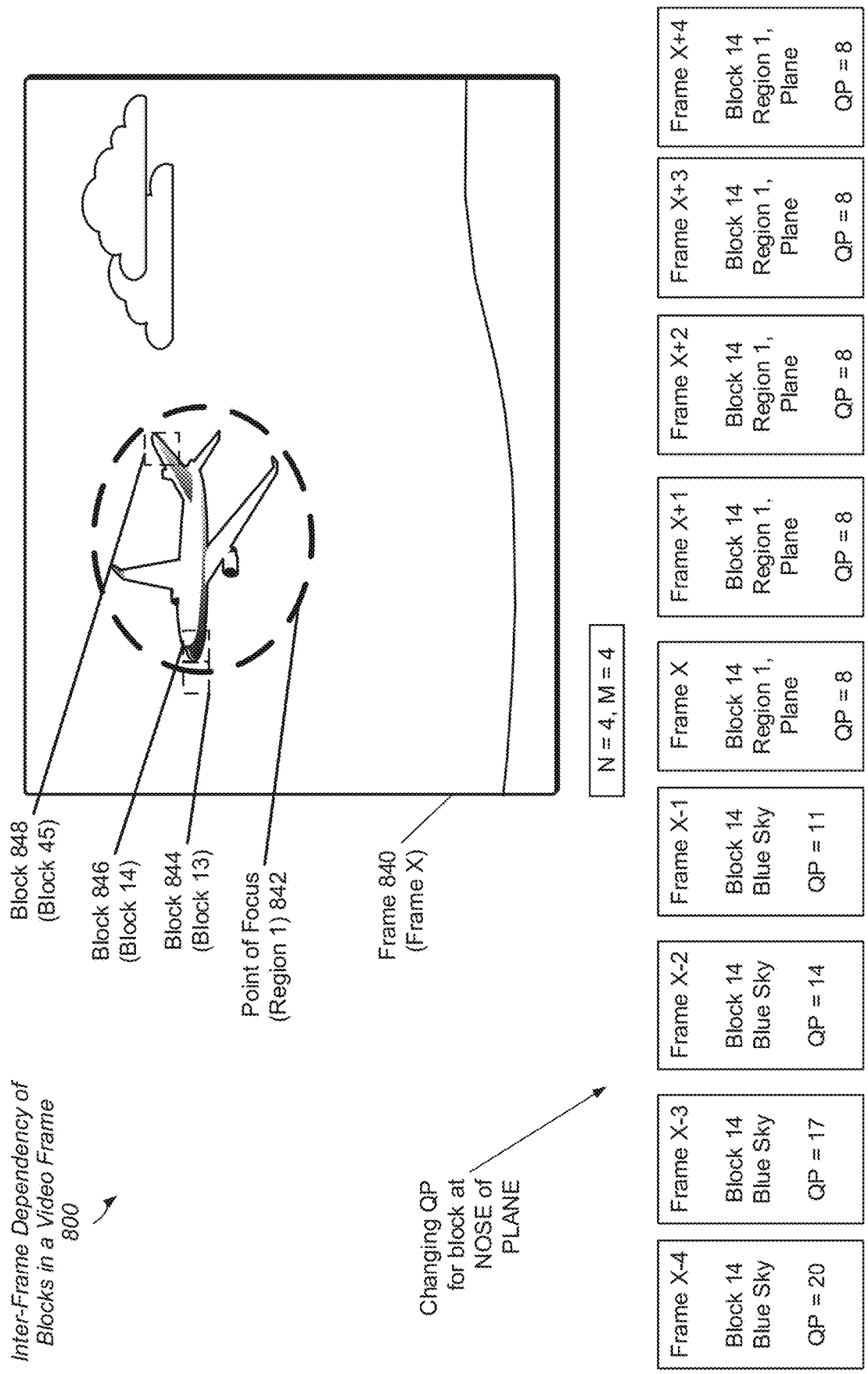
FIG. 8 is a block diagram of one embodiment of inter-frame dependency of blocks in a video frame.

Turning now to FIG. 8, a block diagram of one embodiment of inter-frame dependency of blocks in a video frame 800 is shown. In various embodiments, a transmitter sends video information to a receiver such as rendered information corresponding to the frame 840. Although the frame 840 depicts a picture of a plane flying in the sky, in other examples, the frame 840 includes information for a wide variety of visual information such as a scene of a sporting event, a scene of a video game, and so forth. A software hint or a hardware hint identifies the plane as the point of focus 842, and thus, a region, in the scene. In some embodiments, the side information for the frame 840 includes an indication of the point of focus 842, which is the plane. Below the frame 840 are multiple examples of an encoding parameter for various frames of the scene depicted in the frame 840. Although a quantization parameter (QP) is shown as an example of an encoding parameter, one or more other encoding parameters changing across frames are also possible and contemplated.

For objects that are not located in any point of focus, such as the background sky, the clouds and the land below, the encoder selects a compression ratio higher than the compression ratio for the point of focus 842. As shown, frame 840 is frame X where X is a positive, non-zero integer. In various embodiments, the video encoder replaces or updates the QP for a given block in the frame 840 (frame X) by considering the N preceding frames and considering the M following frames where each of N and M is a positive, non-zero integer. In other words, in some embodiments, the side information for the frame 842 (frame X) includes a portion of the side information from each frame from frame X−N to frame X+M, where N is less than X.

For frame 840 (frame X), block 13 (block 844) is blue sky, block 14 (block 846) is the nose of the plane in the point of focus 842, and block 45 (block 848) is the tail of the plane in the point of focus 842. However, for frame X−1, block 14 is blue sky, since the plane has not yet arrived at block 14. Similarly, for frame X−N to frame X−1, block 14 is blue sky. In an example, the QP for the blue sky is 20, whereas, the QP for the point of focus region 842 (plane) is 8. It is possible that the abrupt change in QP causes flickering to be seen on the screen by the viewer.

In order to avoid abrupt changes in compression levels between two successive frames, the video encoder changes QP across frames in a more continuous manner. For example, the video encoder generates a weighed sum, which is used as an averaging formula, to determine the QP for block 14 across multiple frames. In the illustrated example, N is 4 and M is 4, so the video encoder updates the QP for block 14 across 4 previous frames, and reduces the QP from 20 to 8 in steps of 3, since (20−8)/4 is 3. Here, each of the frames X−N to X has a same weight of one. In this example, the video encoder generates the QP across frames X−4 to X to be 20, 17, 14, 11 and 8. In other words, the video encoder generates the QP for block 14, frame X−4 to 10, and the QP for block 14, frame X−3 to be 17, and the QP for block 14, frame X−2 to be 14, and the QP for block 14, frame X−1 to be 11, and the QP for block 14, frame X to be 8. There is no abrupt change in QP for block 14 between two frames. Since block 14 for the frames immediately after frame 840 (frame X) includes the point of focus 842 (plane), the QP remains at 8 for block 14 for frame X to frame X+4.

Figure 9:
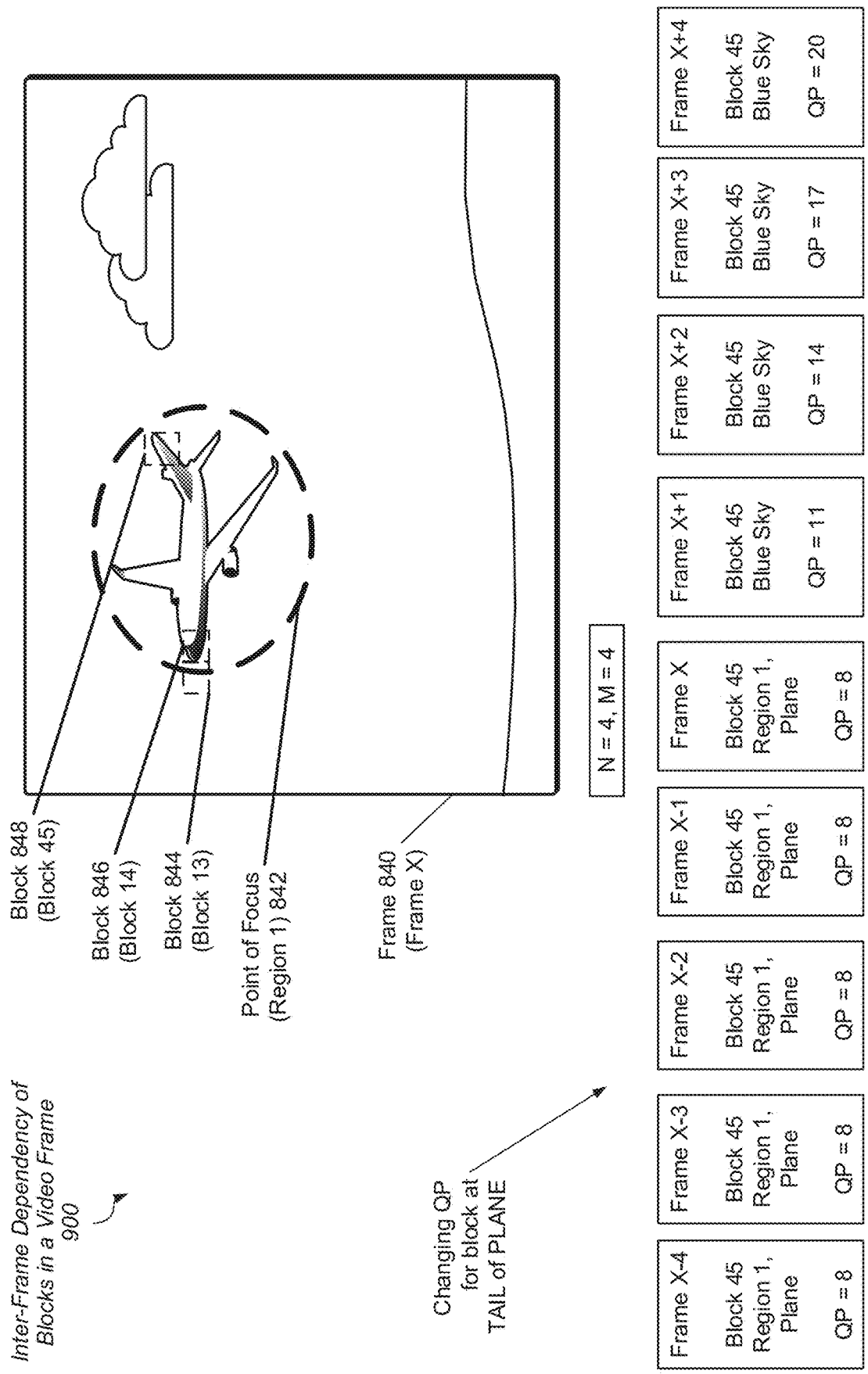
FIG. 9 is a block diagram of one embodiment of inter-frame dependency of blocks in a video frame.
Figure 10:
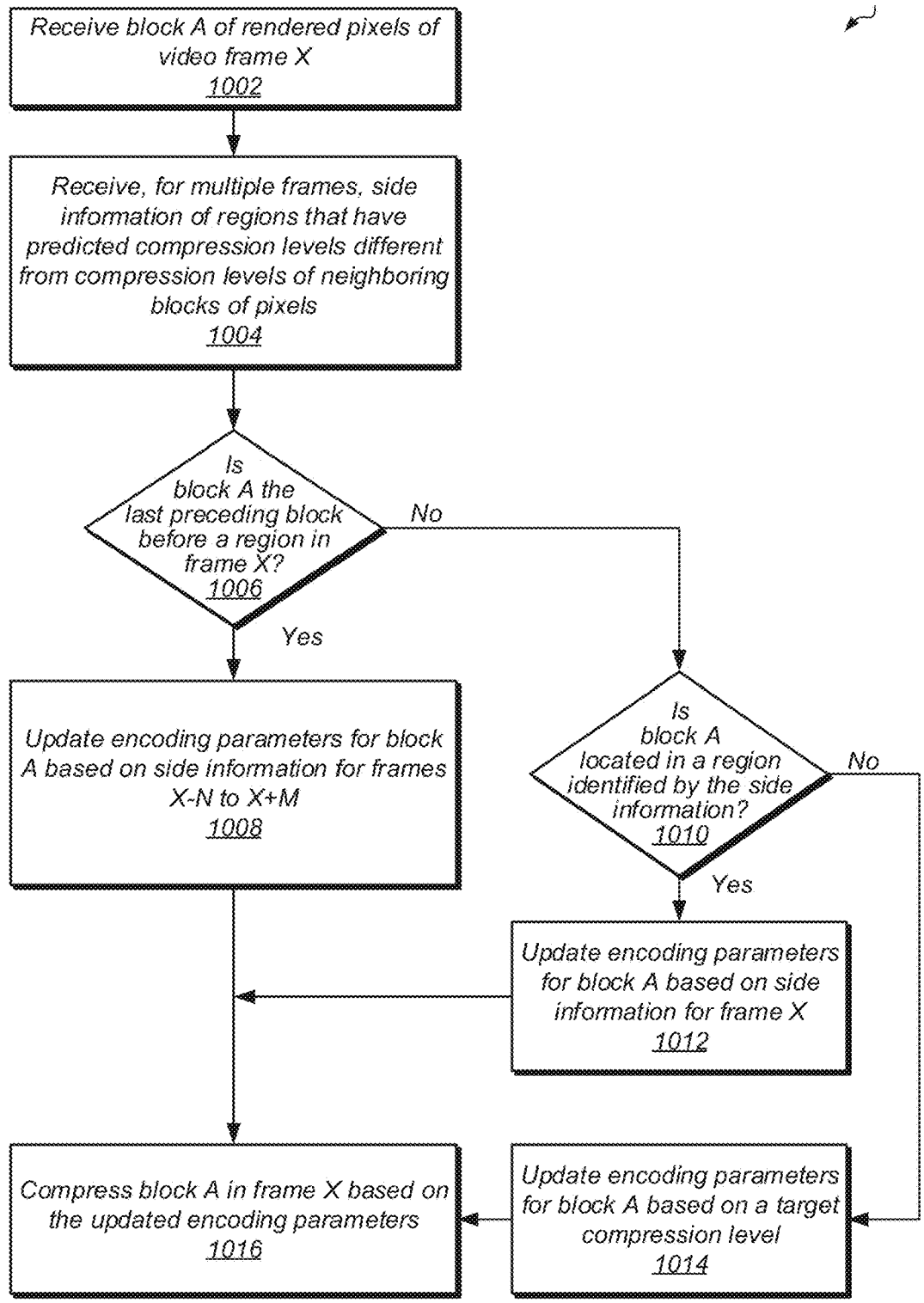
FIG. 10 is a flow diagram of one embodiment of a method for performing efficient video compression.

Turning now to FIG. 9, a block diagram of one embodiment of inter-frame dependency of blocks in a video frame 900 is shown. Video information previously described are numbered identically. In the illustrated example, N is 4 and M is 4, so the video encoder updates the QP for block 45 (block 848) across 4 following frames, and increases the QP from 8 to 20 in steps of 3, since (20−8)/4 is 3. Here, each of the frames X−N to X has a same weight of one. In this example, the video encoder generates the QP across frames X to X+4 to be 8, 11, 14, 17 and 20. In other words, the video encoder generates the QP for block 45, frame X to be 8, and the QP for block 14, frame X+1 to be 11, and the QP for block 45, frame X+2 to be 14, and the QP for block 45, frame X+3 to be 17, and the QP for block 45, frame X+4 to be 20. There is no abrupt change in QP for block 14 between two frames. Since block 45 for the frames immediately prior to frame 840 (frame X) includes the point of focus 842 (plane), the QP remains at 8 for block 45 for frame X−4 to frame X.

Referring now to FIG. 10, one embodiment of a method 1000 for performing efficient video compression is shown. An encoder receives rendered pixels of block A of multiple blocks of a video frame (block 1002). The encoder also receives, for multiple frames, side information storing information about regions of the video frame that have predicted compression levels different from compression levels of neighboring blocks of pixels (block 1004). If block A is the last preceding block before a region in frame X ("yes" branch of the conditional block 1006), then the video encoder updates encoding parameters for block A based on side information for frames X−N to X+M. In various embodiments, the video encoder performs the steps illustrated earlier in FIGS. 8 and 9.

If block A is not the last preceding block before a region in frame X ("no" branch of the conditional block 1006), and the selected block is not located in a region identified by the side information ("no" branch of the conditional block 1010), then the encoder updates encoding parameters for the selected block based on the target compression level (block 1014). However, if the selected block is located in a region identified by the side information ("yes" branch of the conditional block 1010), then the encoder updates encoding parameters for the selected region based on the received side information (block 1012). For example, when the encoder determines, from the received side information, that the region has a larger compression level than a compression level of the immediately neighboring blocks, in some embodiments, the encoder increases the quantization parameter. After updating one or more encoding parameters in any one of blocks 1008, 1012 and 1014, the encoder compresses the selected region based on the updated encoding parameters (block 1016).

Figure 11:
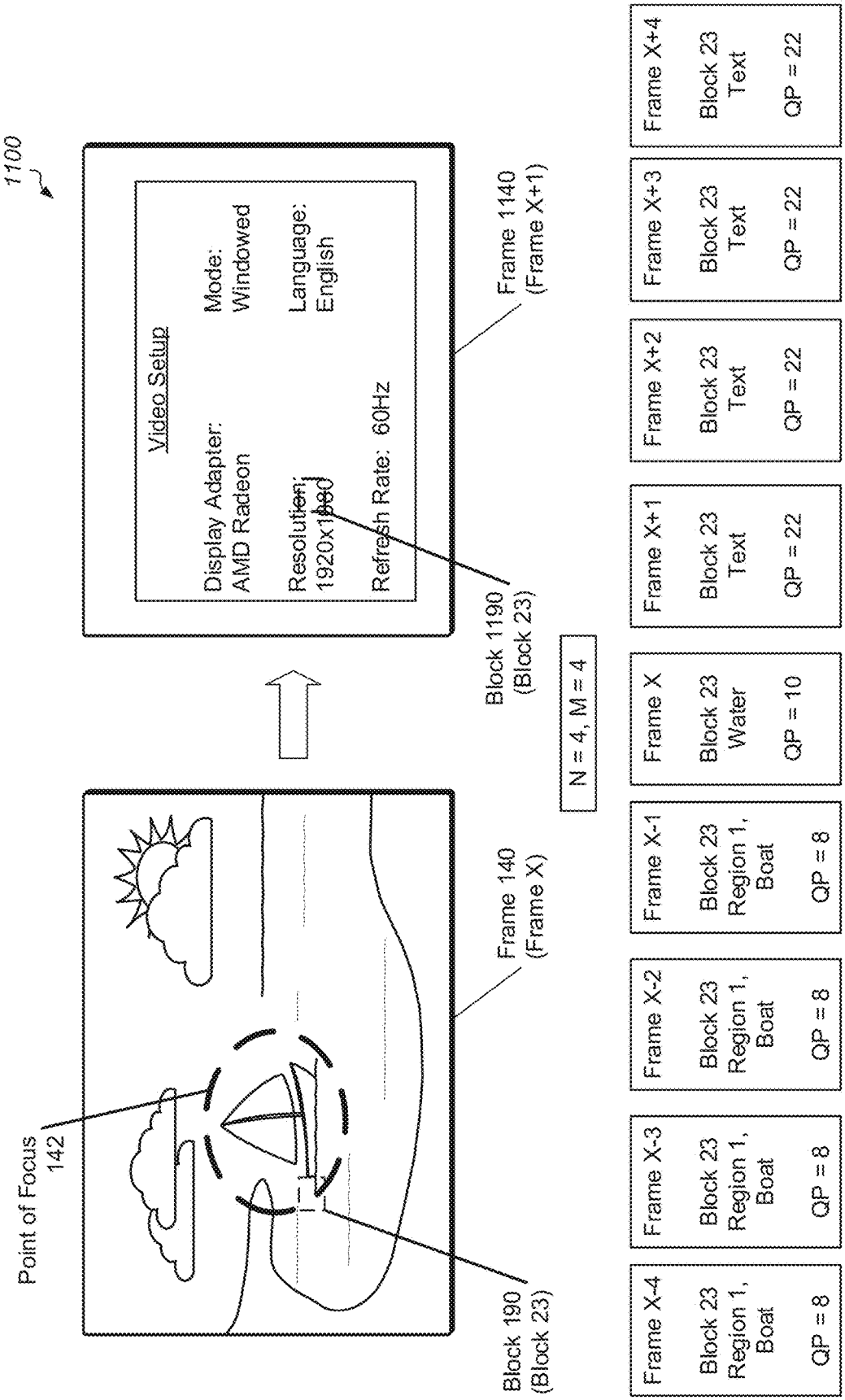
FIG. 11 is a block diagram of one embodiment of inter-frame dependency of blocks in a video frame.

Turning now to FIG. 11, a block diagram of one embodiment of inter-frame dependency of blocks in a video frame 1100 is shown. Video frame information described earlier is numbered identically. A software hint or a hardware hint identifies the sailboat as the point of focus 142, and thus, a region, in the scene. In some embodiments, the side information for the frame 140 includes an indication of the point of focus 142, which is the sailboat. Although the frame 140 depicts a sailboat on the water, in other examples, the frame 140 includes information for a wide variety of visual information such as a scene of a sporting event, a scene of a video game, and so forth. Frame 140 is also referred to as frame X in the illustrated example, and frame 1140 (frame X+1) includes new information with none of it overlapping the video information in frame 140 (frame X). Therefore, a scene cut occurs between frame X and frame X+1.

Below the frame 140 (frame X) and frame 1140 (frame X+1), there are multiple examples of an encoding parameter for various frames of the scenes depicted in the frames 140 and 1140. Although a quantization parameter (QP) is shown as an example of an encoding parameter, one or more other encoding parameters changing across frames are also possible and contemplated. For objects that are not located in any point of focus, such as the background sky, the water and the land, the encoder selects a compression ratio higher than the compression ratio for the point of focus 142 (sailboat). In an example, the QP for the point of focus 142 is 8 and the QP for the background objects in frame 140 is 16. The QP for each block in frame 1140 is 22. The scene in the frame 1140 is a video configuration page with text describing different video settings. For example, a video resolution of 1920×1080 is selected, a video refresh rate of 60 hertz (Hz) is selected, and so on.

Since the frame 1140 contains text and a plain background for the video configuration page, the video encoder is able to select a higher compression level, and thus, a lower visual quality for the viewer and a higher QP. In one example, the video encoder updates the QP for the entire frame 1140 (frame X+1) to be 22, which is higher than the QP values of 8 and 16 used in the frame 140 (frame X). However, without the side information for frame 1140, the video encoder is not aware of the content of the frame 1140 prior to encoding the first block of frame 1140. Using the side information for frame 140 (frame X) and frame 1140 (frame X+1), the video encoder is able to update the QP for blocks in each of the frame 140 (frame X) and the frame 1140 (frame X+1) as shown in the text boxes below the frames.

In the illustrated example, N is 4 and M is 4, so the video encoder maintains the QP for block 23 (block 190) in the region defined by the point of focus 142 across 4 previous frames. The video encoder increases the QP from 8 to 10 in frame X. Although a scene cut arrives at frame X+1, in order to avoid the viewer from seeing flickering due to an abrupt change in QP, the encoder still uses M=4 to adjust the QP until the scene cut arrives. When the scene cut arrives in frame X+1, there is an abrupt change for each block in frame X+1, rather than a few blocks of the entire frame. Therefore, for frame X, the encoder updates the QP for block 23 in steps of 2, since (16−8)/4 is 2. Here, each of the frames X−4 to X has a same weight of one. In this example, the video encoder generates the QP across frames X−4 to X to be 8, 8, 8, 8 and 10. The increments of the QP from 10 to 16 in steps of 2 are not used, since the scene cut arrives in frame X+1. For frames X+1 to X+4, the QP for block 23 is 22, which is the QP for each block in frames X+1 to X+4.

Figure 12:
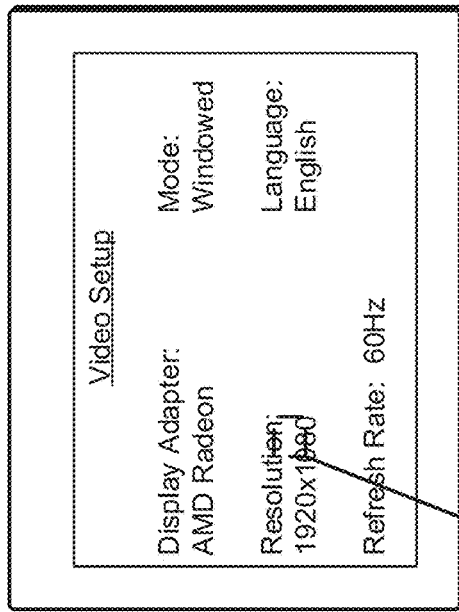
FIG. 12 is a block diagram of one embodiment of inter-frame dependency of blocks in a video frame.
Figure 12:
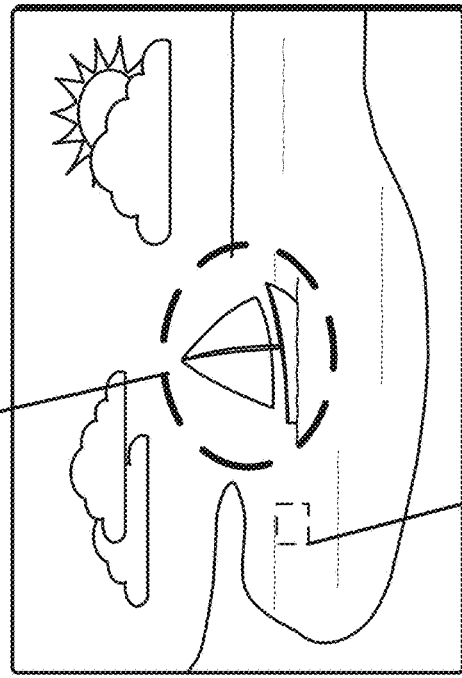
Figure 13:
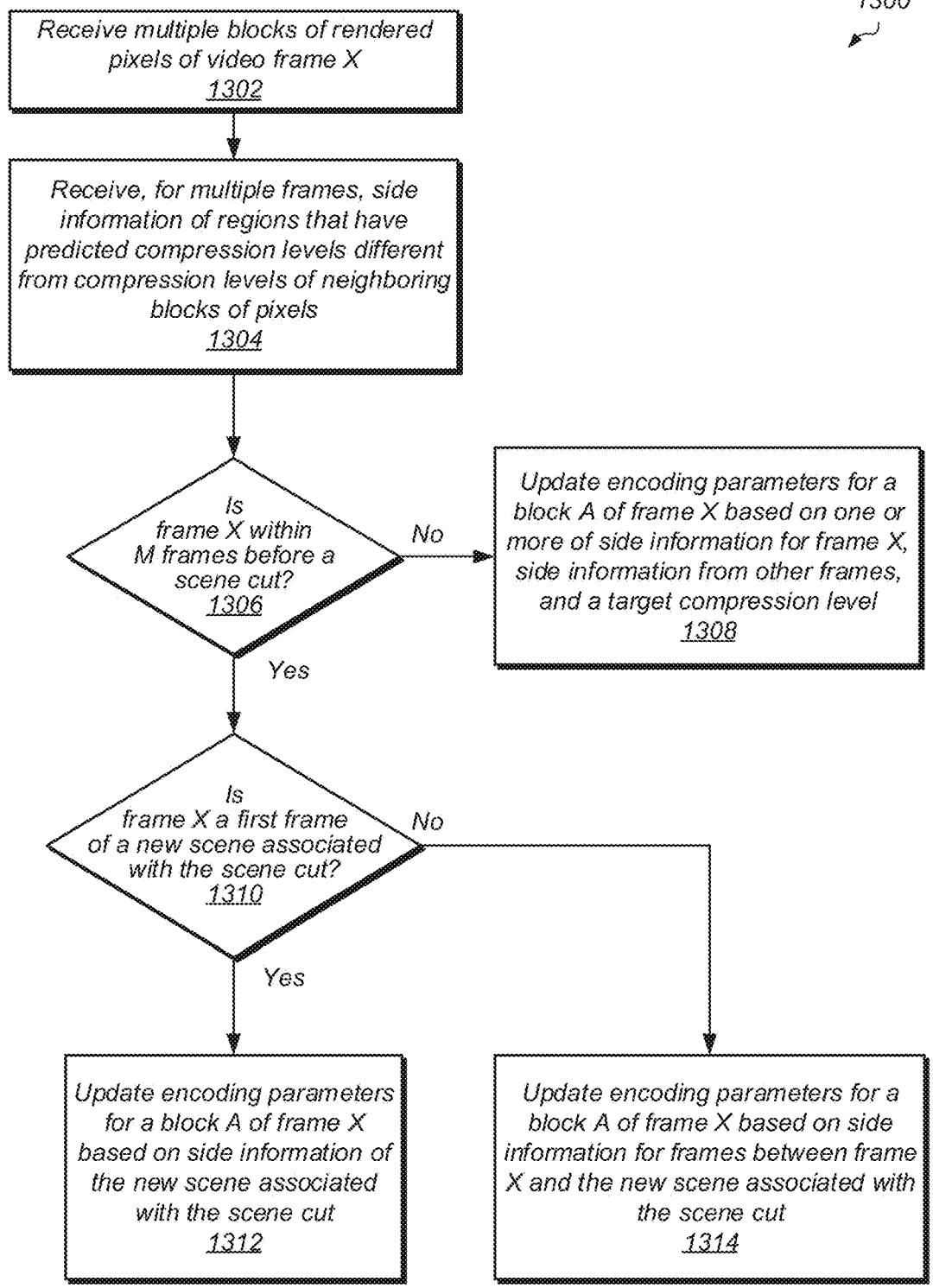
FIG. 13 is a flow diagram of one embodiment of a method for performing efficient video compression.

Turning now to FIG. 12, a block diagram of one embodiment of inter-frame dependency of blocks in a video frame 1200 is shown. Video information previously described are numbered identically. In some embodiments, the side information for the frame 1240 includes an indication of the point of focus 1242, which is the sailboat. Although the frame 1240 depicts a sailboat on the water, in other examples, the frame 1240 includes information for a wide variety of visual information such as a scene of a sporting event, a scene of a video game, and so forth. Frame 1240 is also referred to as frame X−2 in the illustrated example, and frame 1140 (frame X+1) includes new information with none of it overlapping the video information in frame X (not shown).

Therefore, a scene cut occurs between frame X and frame X+1, but the point of focus 1242 (sailboat) moves past block 23 prior to the scene cut at an earlier time than the previous example shown in FIG. 11. Here, in FIG. 12, the point of focus 1242 (sailboat) moves past block 23 in frame X−2, rather than in frame X as shown in FIG. 11.

In the illustrated example of FIG. 12, N is 4 and M is 4, so the video encoder updates the QP for block 23 (block 1290) across 3 frames prior to the scene cut, and increases the QP from 8 to 14 in steps of 2, since (16−8)/4 is 2. Here, each of the frames X−4 to X has a same weight of one. In this example, the video encoder generates the QP across frames X−4 to X to be 8, 8, 10, 12 and 14. Here, each of the frames X−4 to X has a same weight of one. Although a scene cut arrives at frame X+1, in order to avoid the viewer from seeing flickering due to an abrupt change in QP in block 23, the encoder still uses M=4 to adjust the QP for block 23 until the scene cut arrives. When the scene cut arrives in frame X+1, there is an abrupt change for each block in frame X+1 to use QP=22, rather than a few blocks of the entire frame.

Referring now to FIG. 13, one embodiment of a method 1300 for performing efficient video compression is shown. An encoder receives multiple blocks of rendered pixels of video frame X (block 1302). The encoder receives, for multiple frames, side information of regions that have predicted compression levels different from compression levels of neighboring blocks of pixels (block 1304). In various embodiments, the received side information provides information for frame X, for zero to N frames prior to frame X, and for zero to M frames after frame X. The variables X, N and M are positive, non-zero integers as described earlier. If frame X is not within M frames before a scene cut ("no" branch of the conditional block 1306), then the next scene cut, if any, is more than M frames after frame X. In such a case, the encoder updates encoding parameters for a block A of frame X based on one or more of side information for frame X, side information from other frames, and a target compression level (block 1308). The encoder chooses the information to use for updating the encoding parameters for the block A of frame X based on a number of regions that are identified in frame X, a number of frames prior to frame X with available side information, and a number of frames after frame X with available side information. In various embodiments, the video encoder performs one or more of the steps illustrated in earlier methods such as methods 700 and 1000 (of FIG. 7 and FIG. 10).

If frame X is within M frames before the scene cut ("yes" branch of the conditional block 1306), and frame X is a first frame of a new scene associated with the scene cut ("yes" branch of the conditional block 1310), then frame X is within zero frames before the scene cut. In such a case, the encoder updates encoding parameters for the block A of frame X based on at least side information of the new scene associated with the scene cut (block 1312). If frame X is the second frame or a later frame of the new scene associated with the scene cut, then control flow of method 1300 moves based on the earlier conditional block 1306 and any other next scene cut. If frame X is not the first frame of a new scene associated with the scene cut ("no" branch of the conditional block 1310), then frame X is within one to M frames before the new scene associated with the scene cut. In such a case, the encoder updates encoding parameters for a block A of frame X based on at least side information for the frames between frame X and the first frame of the scene cut (block 1314). In various embodiments, the video encoder performs the steps illustrated earlier in FIGS. 11 and 12.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors that execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   interface circuitry configured to receive data; and
   an encoder coupled to the interface circuitry;
   wherein the encoder is configured to:
   receive a plurality of blocks of rendered pixels of a video frame and side information separate from the plurality of blocks of rendered pixels of the video frame; and
   in response to determining, based on the side information, that a given region comprises one or more blocks of the plurality of blocks of the video frame predicted to be encoded with a first compression level, specified as an absolute or relative value, different from a second compression level of immediately neighboring blocks outside the given region, compress the one or more blocks of the given region using a compression level different from the second compression level.

2. The system as recited in claim 1, wherein in response to determining, based on the side information, that each block of the plurality of blocks of the video frame has a predicted third compression level indicated by the side information, compress the video frame using the third compression level.

3. The system as recited in claim 1, wherein to compress the one or more blocks of the given region, the encoder is further configured to update one or more encoding parameters based on the predicted first compression level specified in the received side information.

4. The system as recited in claim 3, wherein to update the one or more encoding parameters, the encoder is further configured to:
   generate a given encoding parameter as though the encoder did not receive the side information; and
   replace the given encoding parameter with a value of the given encoding parameter based on the side information.

5. The system as recited in claim 3, further comprising a processor, wherein in response to receiving a software hint or a hardware hint indicating the given region exists in the video frame, the processor generates the side information, wherein the side information comprises:
   a location of the given region in the video frame; and
   a type of content in the given region that causes different compression levels between the given region and the immediately neighboring blocks.

6. The system as recited in claim 5, wherein in response to determining the given region comprises a predicted point of focus in the video frame, the processor is further configured to:
predict the compression level for the given region is smaller than the compression level for the immediately neighboring blocks; and
insert in the side information an indication specifying the type of content is the predicted point of focus in the video frame.

7. The system as recited in claim 3, wherein in response to determining, from the received side information, the plurality of blocks of the given region have a smaller compression level than a compression level of the immediately neighboring blocks, the encoder is further configured to decrease a quantization parameter.

8. The system as recited in claim 5, wherein the side information further comprises:
a respective location of the given region in N video frames preceding the video frame, wherein N is a positive, non-zero integer; and
one or more encoding parameters of a first block preceding the given region in the N video frames.

9. The system as recited in claim 8, wherein the encoder is further configured to compress the first block by updating one or more encoding parameters for the first block based on a weighted sum of the one or more encoding parameters for the first block in the N preceding video frames.

10. A method, comprising:
receiving a plurality of blocks of rendered pixels of a video frame and side information separate from the plurality of blocks of rendered pixels of the video frame; and
in response to determining, based on the side information, that a given region comprises one or more blocks of the plurality of blocks of the video frame predicted to be encoded with a first compression level, specified as an absolute or relative value, different from a second compression level of immediately neighboring blocks outside the given region, compressing the one or more blocks of the given region using a compression level different from the second compression level.

11. The method as recited in claim 10, wherein to compress the plurality of blocks of the given region, the method further comprises updating one or more encoding parameters based on the predicted first compression level specified in the received side information.

12. The method as recited in claim 11, wherein in response to receiving a software hint or a hardware hint indicating the given region exists in the video frame, the method further comprises a processor generating the side information, wherein the side information comprises:
a location of the given region in the video frame; and
a type of content in the given region that causes different compression levels between the given region and the immediately neighboring blocks.

13. The method as recited in claim 12, wherein in response to determining the given region comprises a type of object that includes a predicted point of focus in the video frame, the method further comprises:
predicting the compression level for the given region is smaller than the compression level for the immediately neighboring blocks; and
inserting in the side information an indication specifying that the type of content is the predicted point of focus in the video frame.

14. The method as recited in claim 11, wherein in response to determining, from the received side information, the plurality of blocks of the given region have a smaller compression level than the compression level of the immediately neighboring blocks, the method further comprises performing a full search, rather than a fast search, of the plurality of blocks in a search area during motion estimation.

15. The method as recited in claim 11, wherein in response to determining, from the received side information, the plurality of blocks of the given region have a smaller compression level than a compression level of the immediately neighboring blocks, the method further comprises increasing a precision of fractions generated by an arithmetic entropy coding algorithms.

16. A non-transitory computer readable storage medium storing program instructions, wherein the program instructions are executable by a processor to:
receive a plurality of blocks of rendered pixels of a video frame and side information separate from the plurality of blocks of rendered pixels of the video frame; and
in response to determining, based on the side information, that a given region comprises one or more blocks of the plurality of blocks of the video frame predicted to be encoded with a first compression level, specified as an absolute or relative value, different from a second compression level of immediately neighboring blocks outside the given region, compress the one or more blocks of the given region using a compression level different from the second compression level.

17. The non-transitory computer readable storage medium as recited in claim 16, wherein in response to receiving a software hint or a hardware hint indicating the given region exists in the video frame, the program instructions are further executable by a processor to update one or more encoding parameters based on the predicted first compression level specified in the received side information.

18. The non-transitory computer readable storage medium as recited in claim 17, wherein in response to receiving a software hint or a hardware hint indicating the given region exists in the video frame, the program instructions are executable by a processor to generate the side information, wherein the side information comprises:
a location of the given region in the video frame; and
a type of content in the given region that causes different compression levels between the given region and the immediately neighboring blocks.

19. The non-transitory computer readable storage medium as recited in claim 18, wherein in response to determining the given region comprises a predicted point of focus in the video frame, the program instructions are executable by a processor to:
predict the compression level for the given region is smaller than the compression level for the immediately neighboring blocks; and
insert in the side information an indication specifying the type of content is the predicted point of focus in the video frame.

20. The non-transitory computer readable storage medium as recited in claim 17, wherein in response to determining, from the received side information, the plurality of blocks of the given region have a smaller compression level than a compression level of the immediately neighboring blocks, the program instructions are further executable by a processor to decrease a quantization parameter.

* * * * *